(12) United States Patent  
Yamada et al.

(10) Patent No.: US 9,176,518 B2  
(45) Date of Patent: Nov. 3, 2015

(54) HANDLE RETURNING APPARATUS AND SEAT LIFTING APPARATUS FOR VEHICLE

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/464,983

(22) Filed: Aug. 21, 2014

(65) Prior Publication Data

US 2015/0076310 A1 Mar. 19, 2015

(30) Foreign Application Priority Data

Sep. 19, 2013 (JP) ................................. 2013-194674

(51) Int. Cl.
- *F16M 13/00* (2006.01)
- *G05G 5/05* (2006.01)
- *B60N 2/16* (2006.01)

(52) U.S. Cl.
CPC ............ *G05G 5/05* (2013.01); *B60N 2/169* (2013.01); *B60N 2/1615* (2013.01)

(58) Field of Classification Search
CPC ........ G05G 5/05; B60N 2/169; B60N 2/1615; B60N 2/2356; B60N 2/167
See application file for complete search history.

(56) References Cited

U.S. PATENT DOCUMENTS

| 6,162,124 A * | 12/2000 | Hiraoka et al. ................. 463/38 |
| 2012/0228915 A1* | 9/2012 | Holzhueter et al. ....... 297/367 P |
| 2013/0026806 A1 | 1/2013 | Yamada et al. |
| 2014/0132053 A1* | 5/2014 | Schuler et al. ............. 297/367 P |

FOREIGN PATENT DOCUMENTS

| JP | 2006-83983 | 3/2006 |
| JP | 4209101 | 1/2009 |
| JP | 2012-158301 | 8/2012 |

* cited by examiner

*Primary Examiner* — Amy Sterling  
(74) *Attorney, Agent, or Firm* — Oblon, McClelland, Maier & Neustadt, L.L.P.

(57) ABSTRACT

A handle returning apparatus includes an input member rotating in conjunction with an operation handle operated to rotate in first and second directions including a neutral position, and a spring member including a plurality of spring portions integrally formed and including different spring forces, each of the spring portions including first and second spring end portions separating from each other in a circumferential direction and being configured to generate a returning force for returning the operation handle to the neutral position by being resiliently deformed on a basis of the rotation operation of the operation handle to bias the input member in a state where one of the first and second spring end portions engages with the input member and the other engages with a fixation member. The plurality of spring portions is selectively switchable therebetween to generate the returning force depending on a condition of the rotation operation.

13 Claims, 27 Drawing Sheets

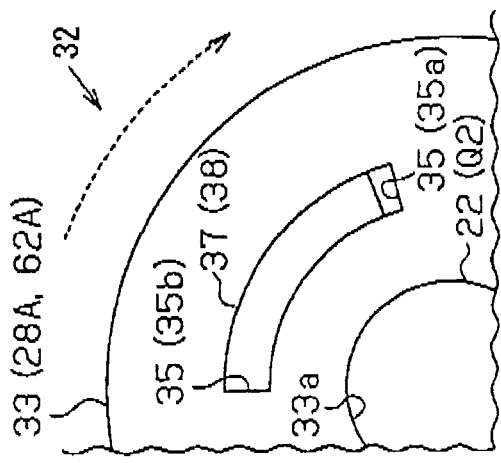
F I G. 12 B
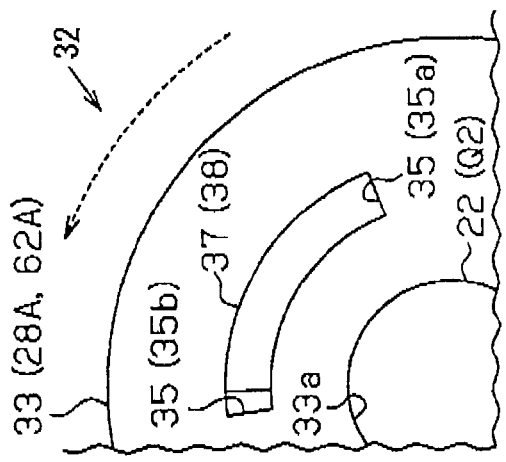
F I G. 12 A

Rotation in first direction (halfway)

Rotation in first direction (maximum)

Rotation in second direction (halfway)

Rotation in second direction (maximum)

F : Returning force
θ : Rotation angle (operation amount α)

Rotation in first direction (halfway)

Rotation in first direction (maximum)

Rotation in second direction (halfway)

Rotation in second direction (maximum)

Rotation in first direction (input operation)

Rotation in first direction (maximum)

Rotation in first direction (return operation)

F : Returning force
θ : Rotation angle (operation amount α)

HANDLE RETURNING APPARATUS AND SEAT LIFTING APPARATUS FOR VEHICLE

CROSS REFERENCE TO RELATED APPLICATIONS

This application is based on and claims priority under 35 U.S.C. §119 to Japanese Patent Application 2013-194674, filed on Sep. 19, 2013, the entire content of which is incorporated herein by reference.

TECHNICAL FIELD

This disclosure generally relates to a handle returning apparatus and a seat lifting apparatus for a vehicle.

BACKGROUND DISCUSSION

A handle returning apparatus for returning an operation handle that is rotationally operated to a neutral position by an elastic force of a spring member is known. For example, JP2006-83983A which will be hereinafter referred to as Reference 1 discloses a seat lifting apparatus including a lever-type operation handle that is rotationally operated in a first direction and a second direction (i.e., an up-down direction) including a neutral position. The seat lifting apparatus disclosed in Reference 1 also includes an input member that rotates in conjunction with the operation handle and a spring member that includes a spring portion in an arc form (substantially in a C-shape) extending around a rotation axis of the input member. The spring member includes opposed end portions which are away from each other in a circumferential direction, one of the end portions engaging with the input member and the other of the end portions engaging with a fixation member. Accordingly, the input member is biased so that a returning force for returning the operation handle to the neutral position is generated in the handle returning apparatus.

Specifically, the input member rotates relative to the fixation member based on the rotation operation of the operation handle so that the spring member is resiliently or elastically deformed in a manner that the opposed end portions of the spring members are resiliently forced apart from each other. Based on a returning force, i.e., an elastic force, generated by the spring member that is resiliently deformed, the operation handle which is pivotally operated may return to the neutral position.

Nevertheless, in the seat lifting apparatus disclosed in Reference 1, in a case where a difference in operation amount (rotation operation amount) of the operation handle occurs depending on a direction of rotation operation of the operation handle, a difference in possible returning force, specifically, in maximum value of possible returning force, may be generated. For example, in a configuration where the operation handle is provided at a side of a vehicle seat in a width direction thereof as in the seat lifting apparatus in Reference 1, it may be difficult to increase the rotation operation amount of the operation handle in a case where the operation handle is pulled downward as compared to a case where the operation handle is lifted upward. Thus, the resulting difference in returning speed and operation reaction force of the operation handle between the cases where the operation handle is pulled downward and where the operation handle is lifted upward affects returning performance of the operation handle, which may be a cause of decrease of operation feeling of the operation handle.

A need thus exists for a handle returning apparatus and a seat lifting apparatus for a vehicle which are not susceptible to the drawback mentioned above.

SUMMARY

According to an aspect of this disclosure, a handle returning apparatus includes an input member rotating in conjunction with an operation handle that is operated to rotate in a first direction and a second direction including a neutral position, and a spring member including a plurality of spring portions which is integrally formed, the plurality of spring portions including different spring forces from one another and extending around a support shaft of the input member. Each of the plurality of spring portions includes first and second spring end portions separating from each other in a circumferential direction of the spring member, each of the plurality of spring portions being configured to generate a returning force for returning the operation handle to the neutral position by being resiliently deformed on a basis of the rotation operation of the operation handle to bias the input member in a state where one of the first and second spring end portions engages with the input member and the other of the first and second spring end portions engages with a fixation member. The plurality of spring portions is selectively switchable therebetween to generate the returning force depending on a condition of the rotation operation of the operation handle.

According to another aspect of this disclosure, a seat lifting apparatus for a vehicle includes a link mechanism including a link member that is rotatably provided, the link mechanism supporting a seat at an upper side of the link mechanism via the link member, a sector gear integrally rotating with the link member via a common rotation shaft, a pinion gear meshed with the sector gear, a handle returning apparatus including an input member rotating in conjunction with an operation handle that is operated to rotate in a first direction and a second direction including a neutral position, and a spring member including a plurality of spring portions which is integrally formed, the plurality of spring portions including different spring forces from one another and extending around a support shaft of the input member, each of the plurality of spring portions including first and second spring end portions separating from each other in a circumferential direction of the spring member, each of the plurality of spring portions being configured to generate a returning force for returning the operation handle to the neutral position by being resiliently deformed on a basis of the rotation operation of the operation handle to bias the input member in a state where one of the first and second spring end portions engages with the input member and the other of the first and second spring end portions engages with a fixation member, the plurality of spring portions being selectively switchable therebetween to generate the returning force depending on a condition of the rotation operation of the operation handle, and a rotation control apparatus disposed between the pinion gear and the operation handle and configured to move the seat upwardly and downwardly by driving to rotate the pinion gear based on a rotation operation input to the operation handle.

BRIEF DESCRIPTION OF THE DRAWINGS

The foregoing and additional features and characteristics of this disclosure will become more apparent from the following detailed description considered with the reference to the accompanying drawings, wherein:

FIGS. 12A and 12B are explanatory views each of which illustrates a connection mechanism;

DETAILED DESCRIPTION

A seat lifting apparatus for a vehicle and a handle returning apparatus according to a first embodiment will be explained with reference to the attached drawings. In the embodiment, directions and orientations such as left, right, front, rear, top, and bottom correspond to those when viewed from an occupant seated on a seat for a vehicle.

Figure 1:
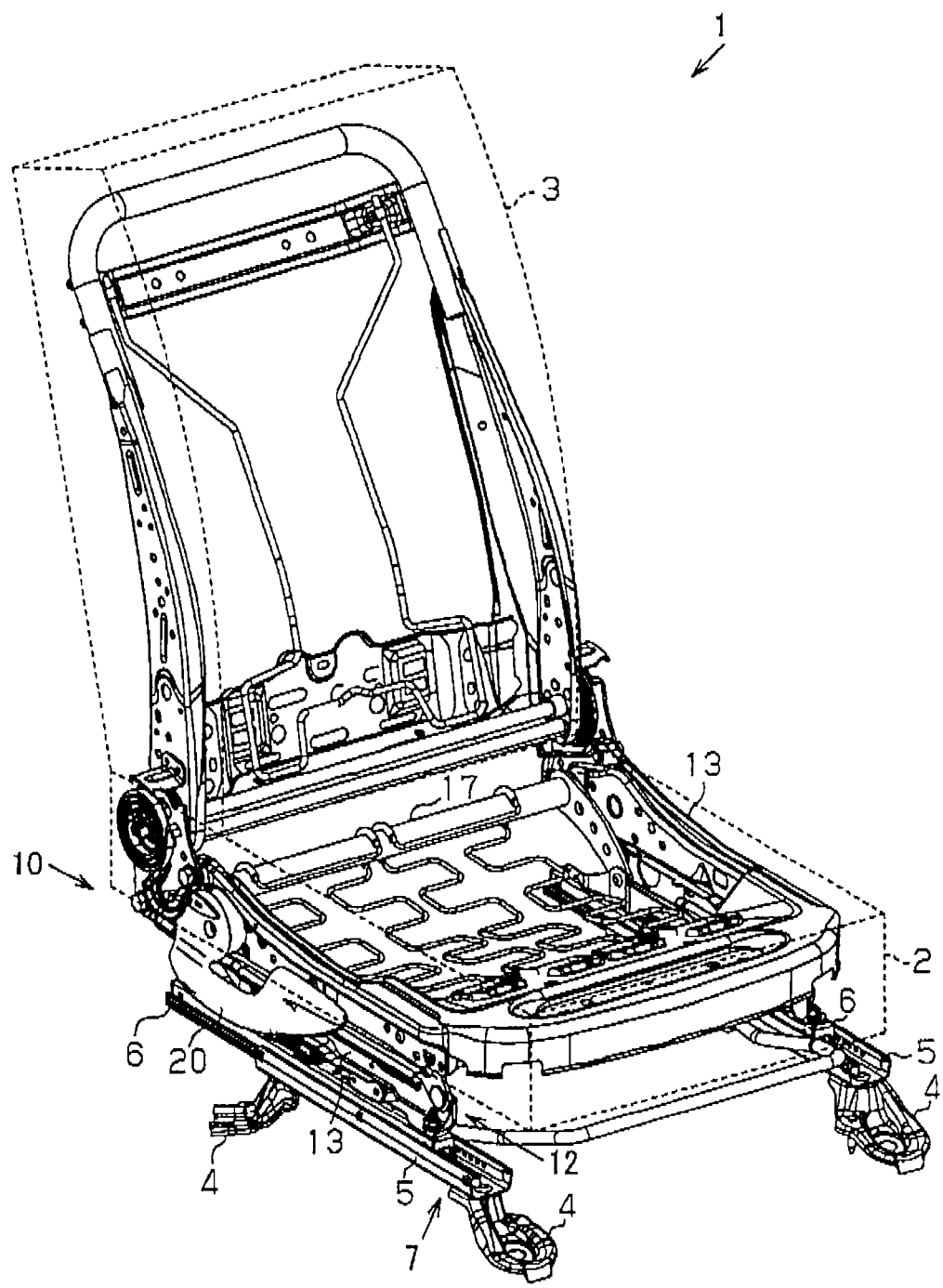
FIG. 1 is a perspective view of a seat for a vehicle according to a first embodiment disclosed here.
Figure 2:
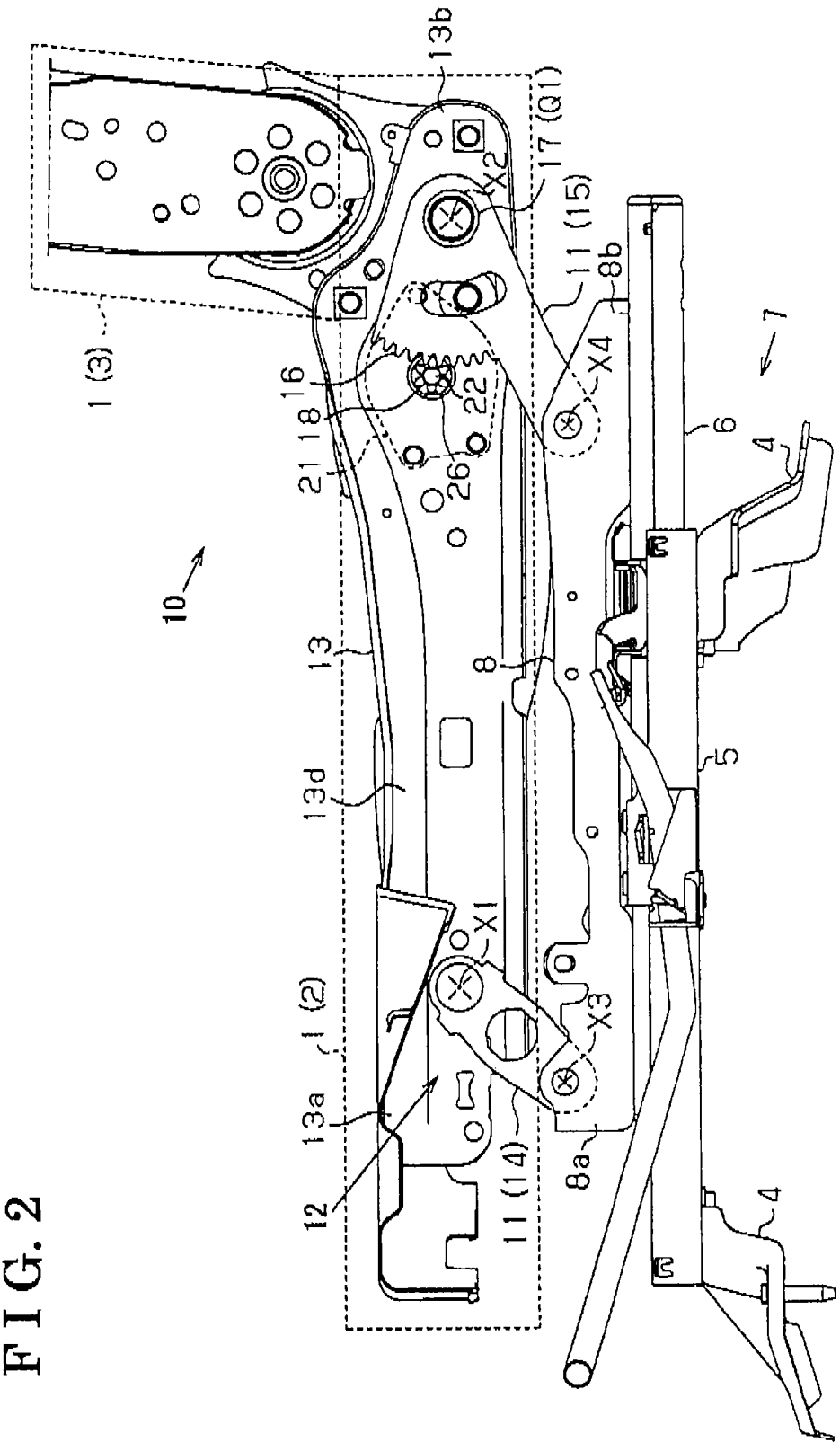
FIG. 2 is a side view of a seat lifting apparatus provided at the seat according to the first embodiment.
Figure 3:
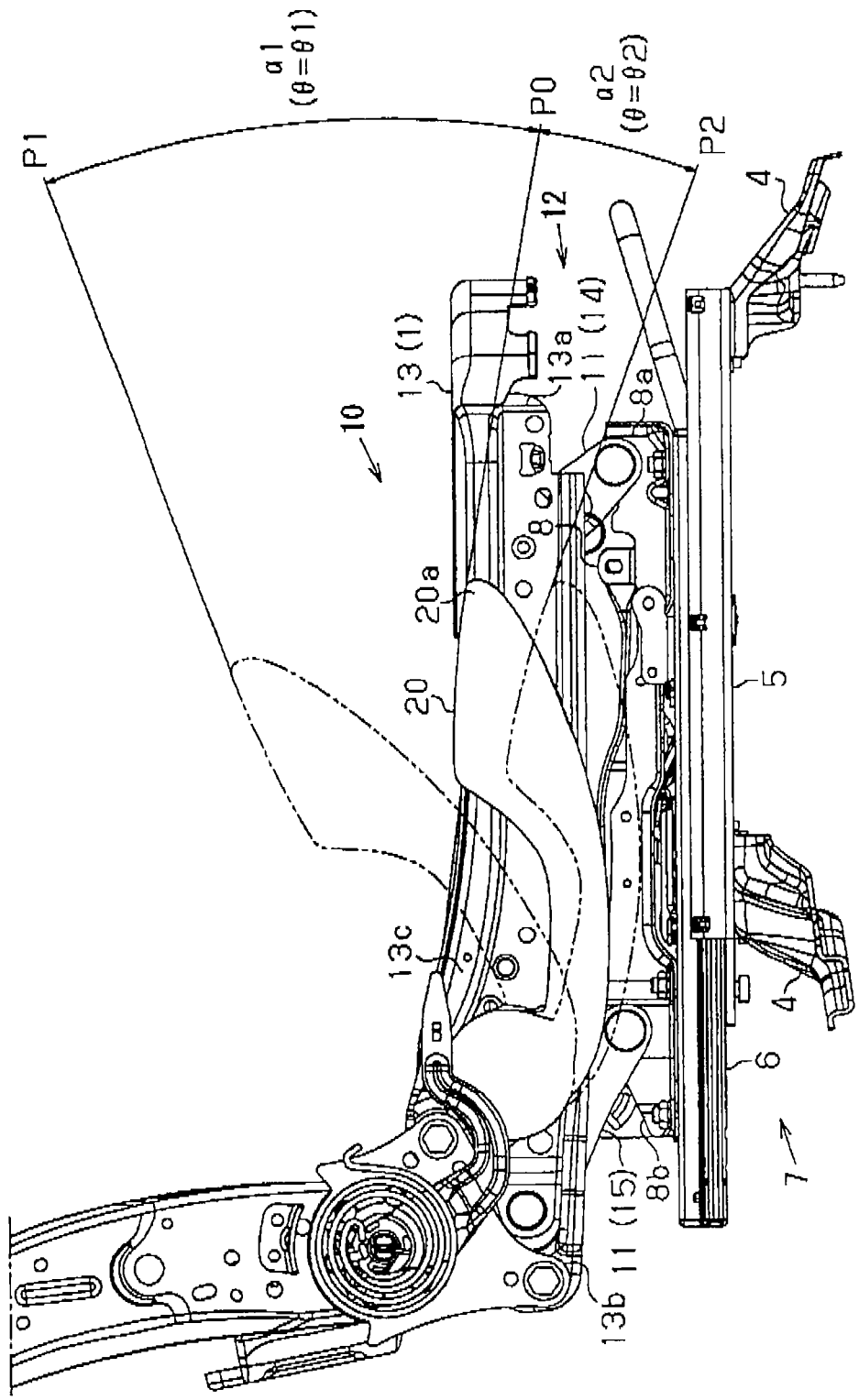
FIG. 3 is a side view of the seat according to the first embodiment.

As illustrated in FIG. 1, a seat 1 for a vehicle includes a seat cushion 2, a seatback 3 provided at a rear end portion of the seat cushion 2 so as to be tiltable relative to the seat cushion 2. As illustrated in FIGS. 1 to 3, a pair of lower rails (right and left lower rails) 5 supported by brackets 4 is provided at a floor portion of a vehicle. A pair of upper rails 6 is mounted at the pair of lower rails 5 to be movable relative to the lower rails 5. The seat 1 is supported upon each of the upper rails 6.

According to the embodiment, the lower rails 5 and the upper rails 6 which are movable relative to the lower rails 5 constitute a seat slide apparatus 7. An occupant of the vehicle utilizes a function of the seat slide apparatus 7 for adjusting a position of the seat 1 in a longitudinal direction of the vehicle (i.e., right-left direction in FIG. 2).

The seat 1 of the embodiment is fixed to each of the upper rails 6 via a seat lifting apparatus 10. The occupant of the vehicle utilizes a function of the seat lifting apparatus 10 for adjusting a position of the seat 1 in an up-down direction, i.e., adjusting a height of the seat cushion 2.

Figure 4:
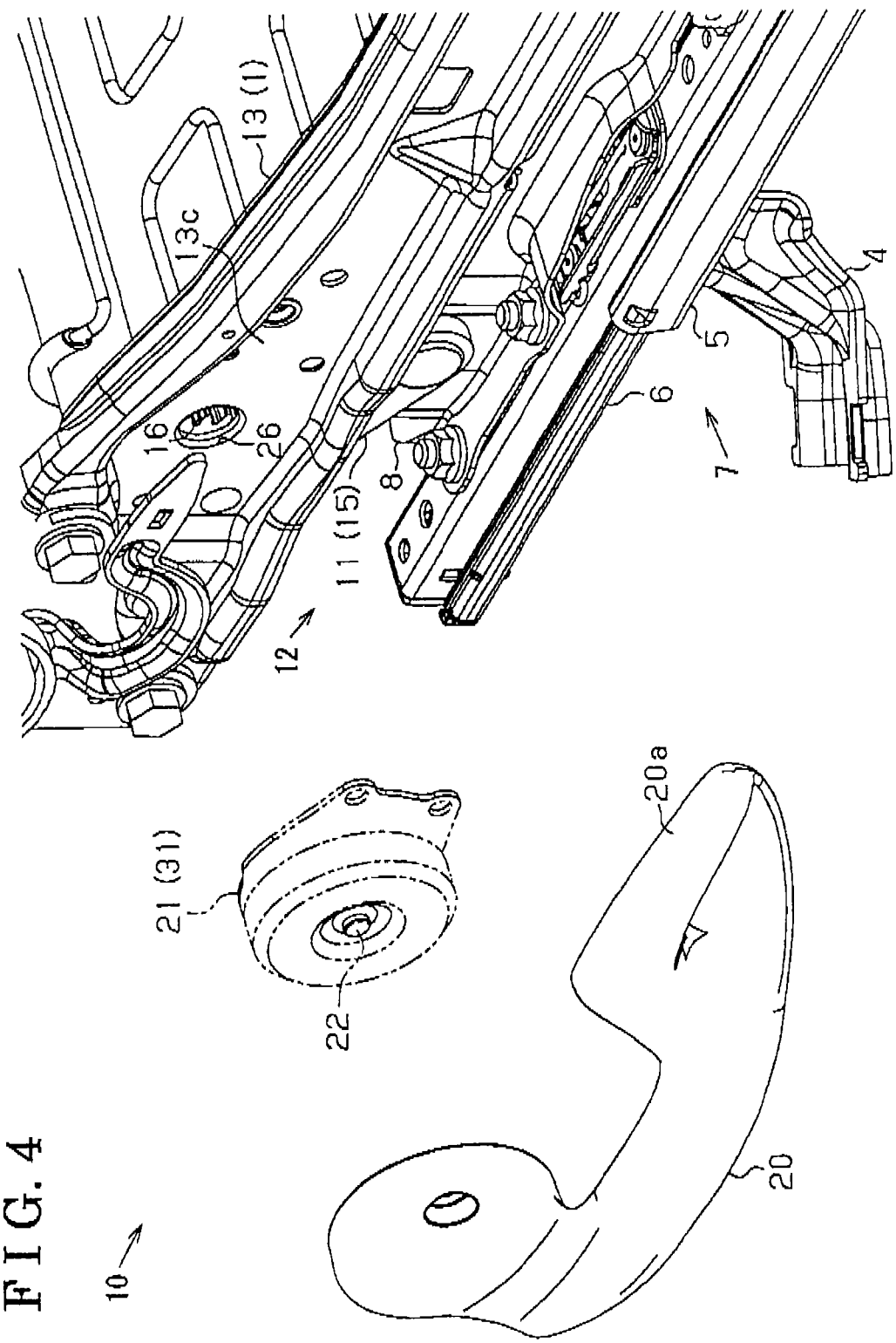
FIG. 4 is a perspective view of an operation handle and a rotation control apparatus constituting the seat lifting apparatus according to the first embodiment.

Specifically, the seat lifting apparatus 10 includes a link mechanism 12 supporting the seat 1 at an upper side of the link mechanism 12 by means of link members 11 that are rotatably provided. As illustrated in FIGS. 3 and 4, the link members 11 of the link mechanism 12 include a front link 14 and a rear link 15 at each side of the seat 1 in a width direction thereof. The front link 14 is rotatably connected to a front end portion 13a of a side frame 13 constituting a frame of the seat cushion 2 and to a front end portion 8a of a support member 8 that is provided at the corresponding upper rail 6. The rear link 15 is rotatably connected to a rear end portion 13b of the side frame 13 and to a rear end portion 8b of the support member 8. That is, the link mechanism 12 is formed by a known parallel link mechanism. Based on rotation of each of the link members 11 that supports the seat 1 at the upper side thereof, the seat 1 moves upward and downward.

As illustrated in FIG. 2, connection points X1 and X2 of the front link 14 and the rear link 15 relative to the side frame 13 are disposed at a rear side of the vehicle than connection points X3 and X4 of the front link 14 and the rear link 15 relative to the support member 8. That is, the seat 1 upwardly supported by the link mechanism 12 moves upward by the link members 11 that rotate so that the connection points X1 and X2 relative to the side frame 13 move forward of the vehicle. In addition, the seat 1 moves downward by the link members 11 that rotate so that the connection points X1 and X2 move rearward of the vehicle.

A sector gear 16 is formed at one of the link members 11 constituting the link mechanism 12, i.e., the rear link 15 connected to one of the side frames 13, specifically, the right side frame. The sector gear 16 is rotatable relative to the connection point X2. That is, the sector gear 16 is integrally rotatable with the rear link 15 with reference to a common rotation shaft Q1. In the embodiment, a torque rod 17 connecting between the rear end portions 13b of the right and left side frames 13 constitutes the rotation shaft Q1. The link mechanism 12 of the embodiment may move the seat 1 that is upwardly supported by the link mechanism 12 in the up-down direction by a driving of the rear link 15 via the sector gear 16.

As illustrated in FIGS. 3 and 4, an operation handle 20 is provided at a side of one of the side frames 13, i.e., at an outer side in the width direction of the seat 1 (at a front side of a paper on which FIG. 3 is drawn). The operation handle 20 is selectively operated to rotate so that the seat 1 moves upward and downward. As illustrated in FIG. 2, a pinion gear 18 is meshed with the sector gear 16. In addition, as illustrated in FIGS. 2 and 4, a rotation control apparatus 21 is disposed between the pinion gear 18 and the operation handle 20.

An operation torque input to the operation handle 20 is transmitted to the pinion gear 18 via the rotation control apparatus 21. Specifically, the operation torque generated in association with a pulling-up of the operation handle 20 is transmitted to the pinion gear 18. Accordingly, the rotation of the pinion gear 18 is controlled to adjust the position of the seat 1 that is upwardly supported by the link mechanism 12 in the up-down direction.

Next, configurations of the rotation control apparatus 21 provided at the seat lifting apparatus 10 and a handle returning apparatus will be explained.

As illustrated in FIGS. 4 to 8, the rotation control apparatus 21 includes a rotation shaft 22 including one end at which the pinion gear 18 is provided, and a bracket 23 supporting the rotation shaft 22 in a state where the rotation shaft 22 is rotatable relative to the bracket 23.

Specifically, the bracket 23 includes a first bracket 23A fixed to an outer side surface 13c of the side frame 13 (the right side frame) constituting the frame of the seat cushion 2 and a second bracket 23B disposed to face the first bracket 23A. In the embodiment, each of the first bracket 23A and the second bracket 23B is formed by deformation processing (press-working) of a metallic plate. The first bracket 23A and the second bracket 23B include a first penetration bore 25a and a second penetration bore 25b respectively those of which face each other. The rotation shaft 22 is rotatably supported at the first and second brackets 23A and 23B in a state to penetrate through the first and second penetration bores 25a and 25b.

The side frame 13 includes a penetration hole 26 into which a first end portion 22a of the rotation shaft 22 at which the pinion gear 18 is provided is insertable. By means of the penetration hole 26, the pinion gear 18 may be meshed with the sector gear 16 that is provided at an inner side surface 13d of the side frame 13 (see FIG. 2).

The rotation control apparatus 21 also includes an input member 28 (specifically, first and second input members 28A and 28B) rotating in conjunction with the operation handle 20 and a spring member 30 configured to be resiliently and elastically deformed on a basis of a rotation operation of the operation handle 20. The input member 28 is biased on a basis of a returning force (i.e., an elastic force) generated by the spring member 30 to thereby constitute a handle returning apparatus 31 for returning the operation handle 20 that is pivotally or rotationally operated, to a neutral position P0.

As illustrated in FIGS. 3 and 4, the operation handle 20 in a lever form includes a handle portion 20a at an end side extending forward of the vehicle and a base side connected to the rotation control apparatus 21. In the aforementioned neutral position P0, the handle portion 20a is disposed substantially parallel to the floor portion of the vehicle.

In the seat lifting apparatus 10 of the embodiment, the operation handle 20 is operated to rotate in a direction in which the handle portion 20a is pulled or lifted upward, i.e., in a first direction, and in a direction in which the handle portion 20a is pulled or pressed downward, i.e., in a second direction. In a case where the operation handle 20 is not operated (i.e., no operation input), the operation handle 20 is configured to return to the neutral position P0 as a basis for the rotation operation of the operation handle 20 by a function of the handle returning apparatus 31.

As illustrated in FIGS. 7 to 11, the handle returning apparatus 31 includes the first input member 28A serving as a first engagement body and the second input member 28B, the first input member 28A and the second input member 28B being coaxially arranged with each other and relatively rotatable to each other. The handle returning apparatus 31 also includes a connection mechanism 32 connecting between the first input member 28A and the second input member 28B so that torque transmission is achievable therebetween. The operation handle 20 is fixed to the first input member 28A.

In the embodiment, each of the first and second input members 28A and 28B is formed by deformation processing (press-working) of a metallic plate. The first input member 28A and the second input member 28B include a first disc portion 33 and a second disc portion 34 respectively. A first circular bore 33a and a second circular bore 34a are formed at respective center portions of the first disc portion 33 and the second disc portion 34. A second end portion 22b of the rotation shaft 22 is inserted to the first and second circular bores 33a and 34a so that the first and second input members 28A and 28B are supported by the rotation shaft 22 serving as a support shaft Q2 in a relatively rotatable manner.

Plural engagement bores (first engagement bores) 35, specifically, three engagement bores 35 in the embodiment, are formed at a radially outer side of the first circular bore 33a of the first disc portion 33 of the first input member 28A so as to extend in a circumferential direction thereof. In addition, plural engagement bores (second engagement bores) 36, specifically, three engagement bores 36 in the embodiment, are formed at a radially outer side of the second circular bore 34a of the second disc portion 34 of the second input member 28B so as to extend in a circumferential direction thereof. The first engagement bores 35 each of which includes an elongated bore in a substantially arc form are disposed at even intervals around the first circular bore 33a. In the same manner, the second engagement bores 36 each of which includes an elongated bore in a substantially arc form are disposed at even intervals around the second circular bore 34a. The handle returning apparatus 31 includes a connection member 38 that includes plural engagement projections 37, specifically, three engagement projections 37 in the embodiment, engaging with both of the first and second engagement bores 35 and 36 formed at the first and second input members 28A and 28B respectively.

The connection member 38 serving as a second engagement body includes a substantially cylindrical outline. The engagement projections 37 are formed by cutting one end portion of the connection member 38 facing the second end portion 22b of the rotation shaft 22 (at an upper side in FIGS. 7 and 8), i.e., a second end portion 38b of the connection member 38, at even intervals in the circumferential direction. Each of the engagement projections 37 includes a cross-section in an arc shape extending in the circumferential direction in the same way as the first and second engagement bores 35 and 36 of the first and second input members 28A and 28B.

The connection member 38 is arranged to be coaxial with the rotation shaft 22 in a state where the rotation shaft 22 is inserted to be positioned within a cylinder portion of the connection member 38. Specifically, the connection member 38 is disposed in an axial direction to penetrate through the second penetration bore 25b of the second bracket 23B. The engagement projections 37 are inserted to be positioned within both the first and second engagement bores 35 and 36 of the first and second input members 28A and 28B in a state where each of the engagement projections 37 is inserted from a side at which the second input member 28B that faces the second bracket 23B is provided (i.e., from a lower side in FIGS. 7 and 8) to penetrate through the second input member 28B and the first input member 28A.

The handle returning apparatus 31 includes an attachment member 39 formed in a substantially disc form. The attachment member 39 includes an insertion bore 39a into which the second end portion 22b of the rotation shaft 22 is inserted to be positioned and plural fitting bores 39b, specifically, three fitting bores 39b in the embodiment, fitted to respective ends of the engagement projections 37 inserted to the first and second engagement bores 35 and 36. In the embodiment, the first and second disc portions 33 and 34 of the first and second input members 28A and 28B are disposed between the attachment member 39 and the second bracket 23B, specifically, between the attachment member 39 and a sliding plate 40 attached to the second penetration bore 25b of the second bracket 23B to thereby restrict the first and second input members 28A and 28B from moving in the axial direction.

Figure 11:
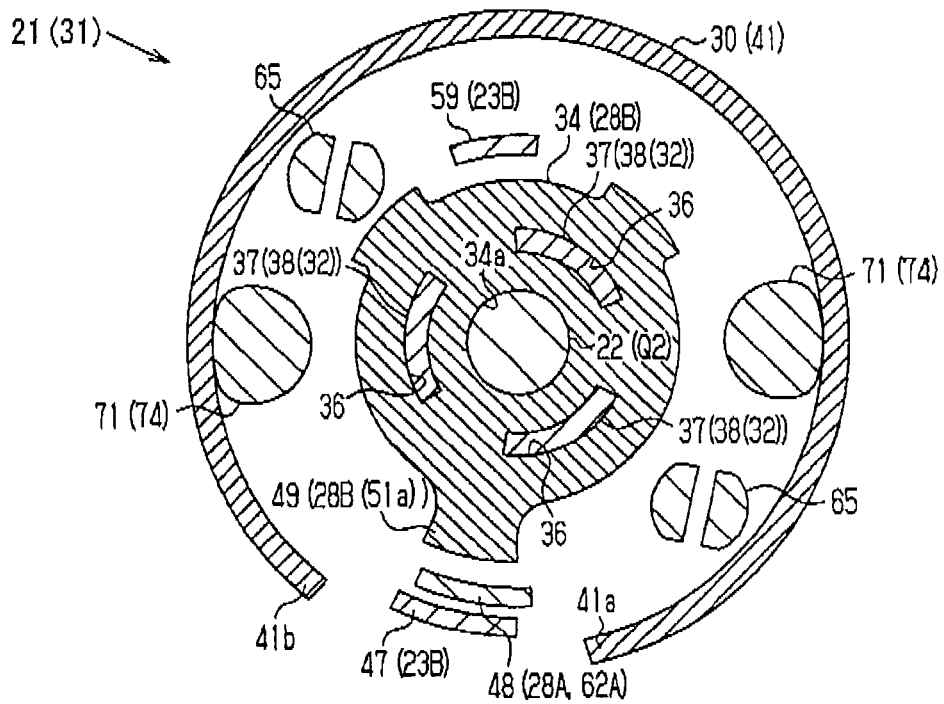
FIG. 11 is a cross-sectional view of the rotation control apparatus taken along line XI-XI in FIGS. 7 and 8.

As illustrated in FIG. 11, each of the second engagement bores 36 formed at the second disc portion 34 of the second input member 28B is formed so that a circumferential length of the second engagement bore 36 is substantially equal to a circumferential length of each of the engagement projections 37 inserted to the second engagement bore 36. Thus, the engagement projection 37 is restricted from moving in the circumferential direction relative to the second engagement bore 36 within which the engagement projection 37 is positioned. Consequently, the second input member 28B and the connection member 38 are connected to be relatively non-rotatable to each other.

Figure 10:
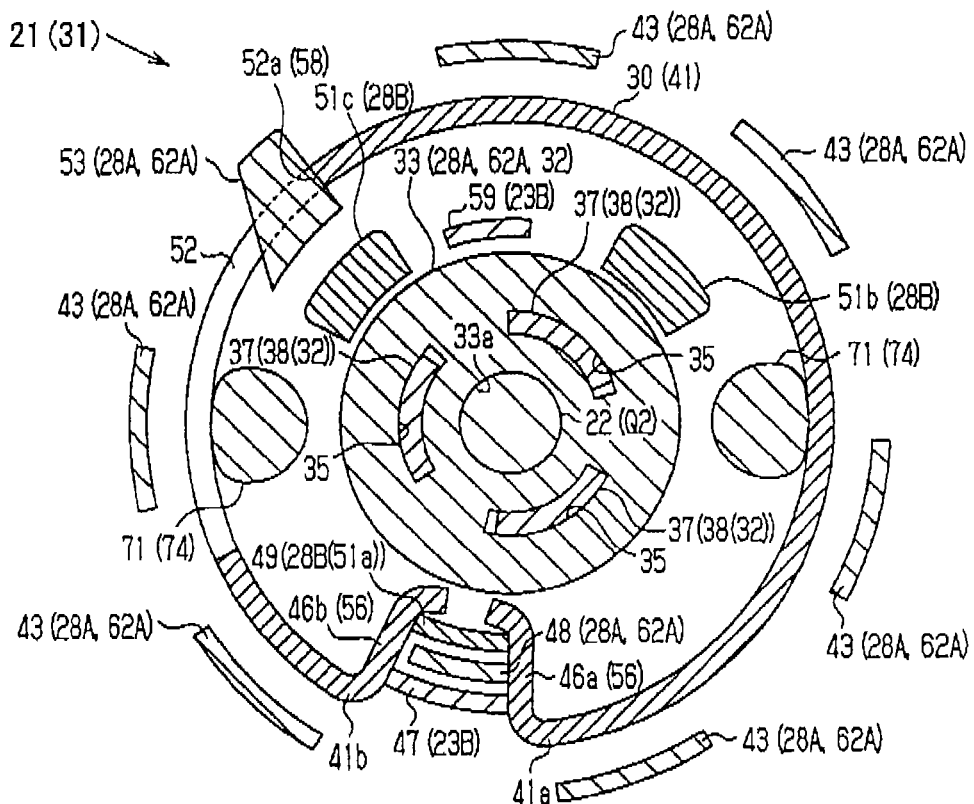
FIG. 10 is a cross-sectional view of the rotation control apparatus taken along line X-X in FIGS. 7 and 8.

On the other hand, as illustrated in FIG. 10, each of the first engagement bores 35 formed at the first disc portion 33 of the first input member 28A is formed so that a circumferential length of the first engagement bore 35 is longer than the circumferential length of each of the engagement projections 37 inserted to the first engagement bore 35. Thus, the engagement projection 37 is movable within the first engagement bore 35 relative thereto in the circumferential direction. Accordingly, the connection mechanism 32 is configured so that the first input member 28A and the second input member 28B are connected to each other in a state where a torque transmission is achievable therebetween and one of the first input member 28A and the second input member 28B is rotated in a delayed phase relative to the other of the first input member 28A and the second input member 28B.

That is, the connection mechanism 32 may transmit a rotation torque input to one of the first and second input members 28A and 28B to the other of the first and second input members 28A and 28B via the connection member 38 in a case where the engagement projections 37 inserted to the first and second engagement bores 35 and 36 of the first and second input members 28A and 28B are in engagement therewith in a relatively non-rotatable manner in the circumferential direction.

Nevertheless, as illustrated in FIGS. 12A and 12B, according to the connection mechanism 32 of the embodiment, a gap is formed between each of the first engagement bores 35 of the first input member 28A and each of the engagement projections 37 based on the difference in the circumferential lengths between the first engagement bore 35 and the engagement projection 37. Thus, in a case where the rotation torque is input to one of the first and second input members 28A and 28B, the engagement projection 37 apparently moves within the first engagement bore 35 relative thereto in a direction to decrease the aforementioned gap, so that the relative rotation between the first input member 28A and the second input member 28B is allowed. Afterwards, the engagement projection 37 that moves within the first engagement bore 35 engages with either a first circumferential end portion 35a or a second circumferential end portion 35b of the first engagement bore 35 so that the torque transmission via the connection member 38 is obtainable. As a result, the first and second input members 28A and 28B rotate in such a manner that one of the first and second input members 28A and 28B rotates in the delayed phase relative to the other of the first and second input members 28A and 28B.

Specifically, in the handle returning apparatus 31 of the embodiment, the first input member 28A rotates in a counterclockwise direction in FIG. 12A in a case where the operation handle 20 is operated to rotate in the first direction. At this time, each of the engagement projections 37 engages with each of the first circumferential end portions 35a of the first engagement bores 35 so that the rotation torque in the first direction is transmittable to the second input member 28B. According to the connection mechanism 32, the second input member 28B rotates in the first direction in the delayed phase corresponding to an angle at which the engagement projection 37 apparently moves within the first engagement bore 35 until the engagement projection 37 engages with the first circumferential end portion 35a.

On the other hand, in a case where the operation handle 20 is operated to rotate in the second direction, the first input member 28A rotates in a clockwise direction in FIG. 12B. At this time, each of the engagement projections 37 engages with each of the second circumferential end portions 35b of the first engagement bores 35 so that the rotation torque in the second direction is transmittable to the second input member 28B. According to the connection mechanism 32, the second input member 28B rotates in the second direction in the delayed phase corresponding to an angle at which the engagement projection 37 apparently moves within the first engagement bore 35 until the engagement projection 37 engages with the second circumferential end portion 35b.

As illustrated in FIGS. 6 to 11, the handle returning apparatus 31 includes the spring member 30 that includes a spring body 41 disposed to extend around the rotation shaft 22 that constitutes the support shaft Q2 of the first and second input members 28A and 28B. The spring member 30 is formed by a so-called ring spring including the spring body 41 that curves in an arc form (substantially in a C-shape). The spring member 30 is disposed between the first input member 28A and the second bracket 23B in the axial direction of the rotation shaft 22.

Figure 7:
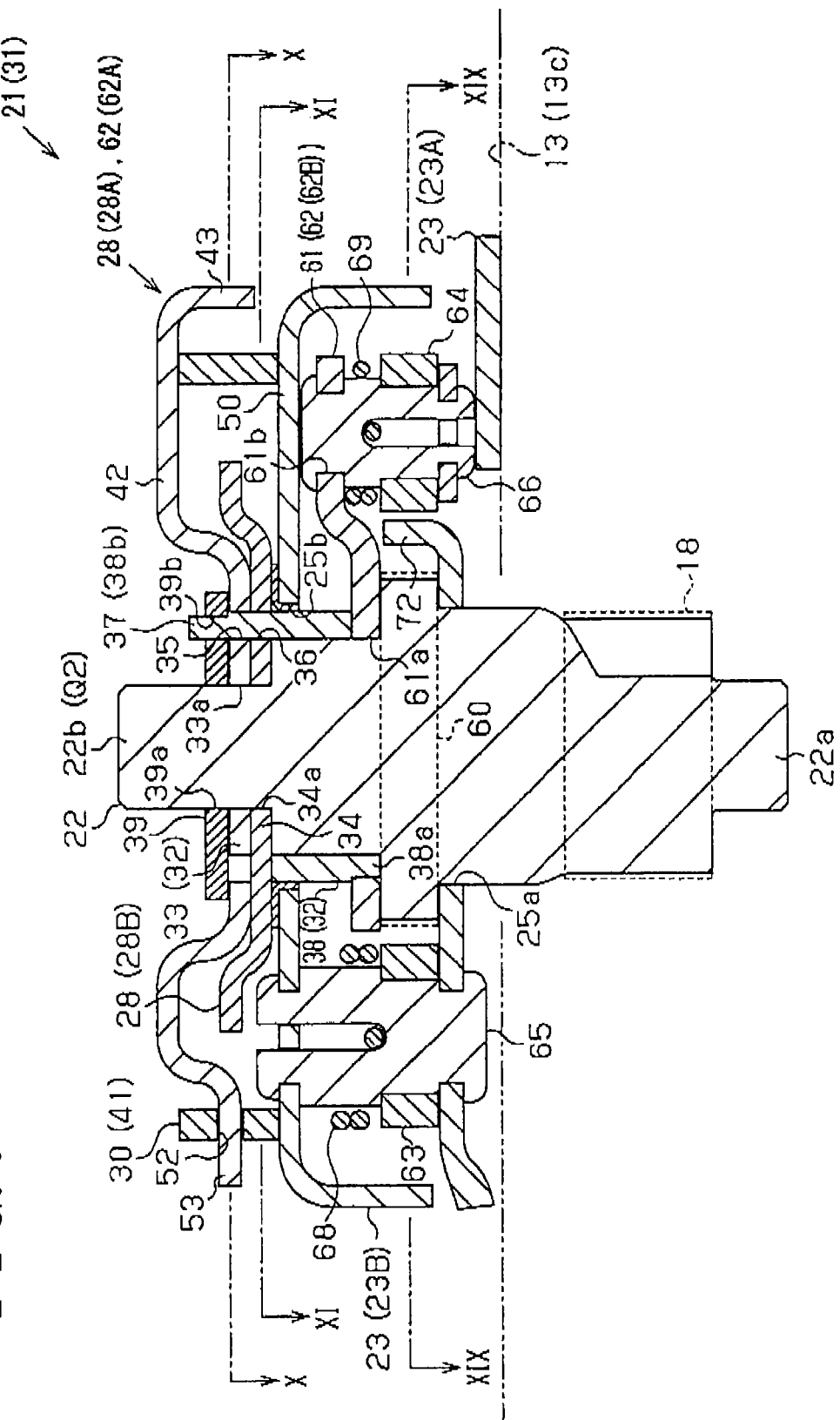
FIG. 7 is a cross-sectional view of the rotation control apparatus taken along line VII-VII in FIG. 6.
Figure 8:
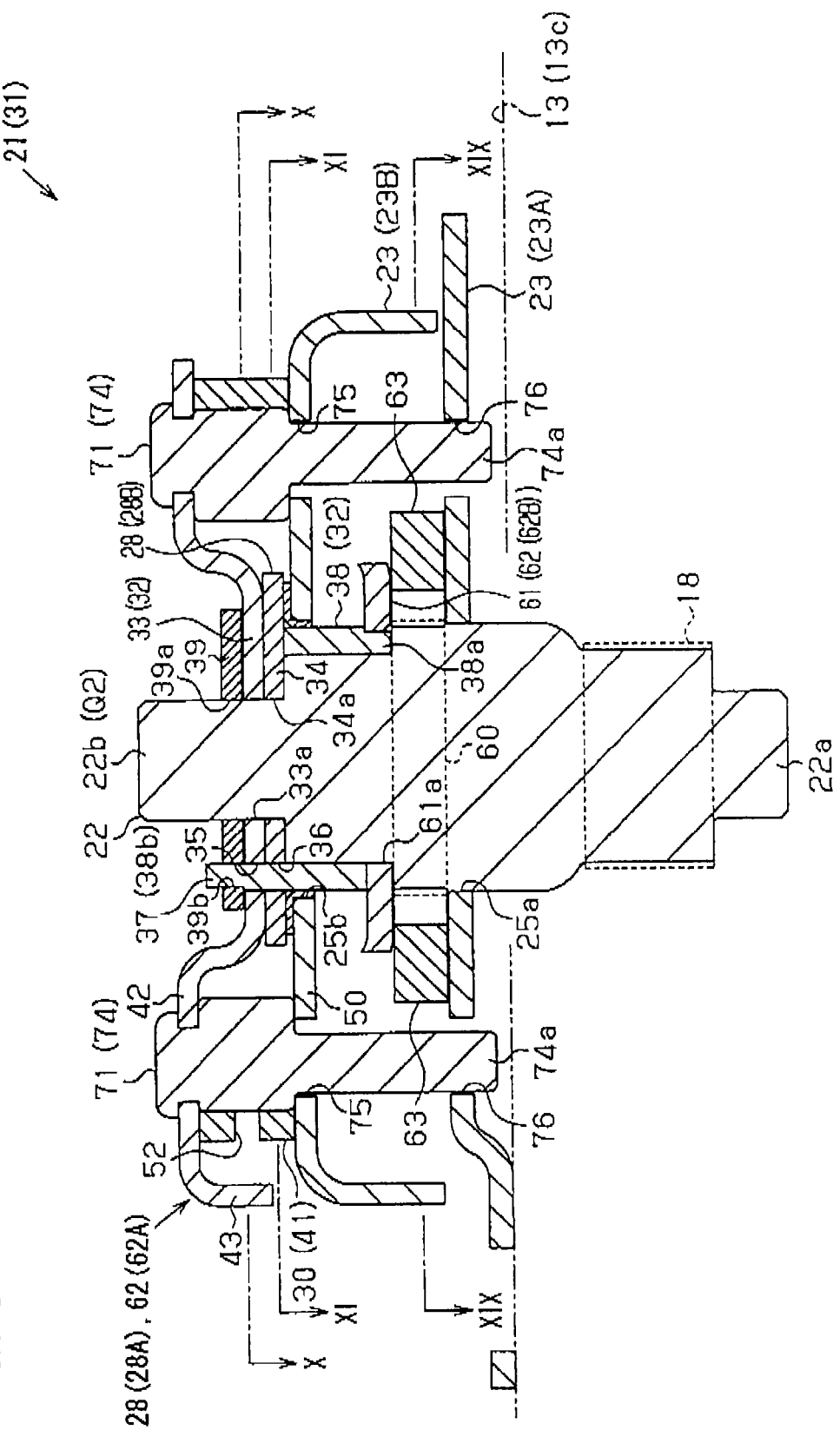
FIG. 8 is a cross-sectional view of the rotation control apparatus taken along line VIII-VIII in FIG. 6.

In the handle returning apparatus 31, specifically, the first input member 28A includes an annular portion 42 disposed to extend at a radially outer side of the disc portion 33 and plural bending portions 43 projecting from an outer peripheral edge of the annular portion 42 in the axial direction of the rotation shaft 22 towards the second bracket 23B (i.e., projecting downward in FIGS. 7 and 8). The disc portion 33 and the annular portion 42 are formed in a stepped manner, i.e., on different planes, so that the bending portions 43 are formed at the radially outer side of the disc portion 33. The second input member 28B is smaller in diameter than the first input member 28A so that a radially outer side of the second input member 28B is surrounded by the bending portions 43 of the first input member 28A. The spring member 30 is disposed at an inner side of the bending portions 43 in a state where the spring body 41 surrounds the radially outer side of the second input member 28B.

The spring member 30 includes plural engagement portions (specifically, end engagement portions 56 and an intermediate engagement portion 58) which are disposed apart from each other in a circumferential direction of the spring body 41 that includes a substantially C-shape. The second bracket 23B, the first and second input members 28A and 28B include engagement projecting portions (which will be explained later) engageable with the engagement portions 56 and 58 of the spring member 30 based on the rotation operation of the operation handle 20.

The spring member 30 includes first and second bending portions 46a and 46b bending radially inwardly from opposed end portions (first and second end portions) 41a and 41b of the spring body 41. The second bracket 23B includes an engagement projecting portion 47 and the first and second input members 28A and 28B include engagement projecting portions 48 and 49 respectively. Each of the engagement projecting portions 47 to 49 is engageable with the spring member 30 in a state to be disposed between the first and second bending portions 46a and 46b serving as the end engagement portions 56.

Figure 9:
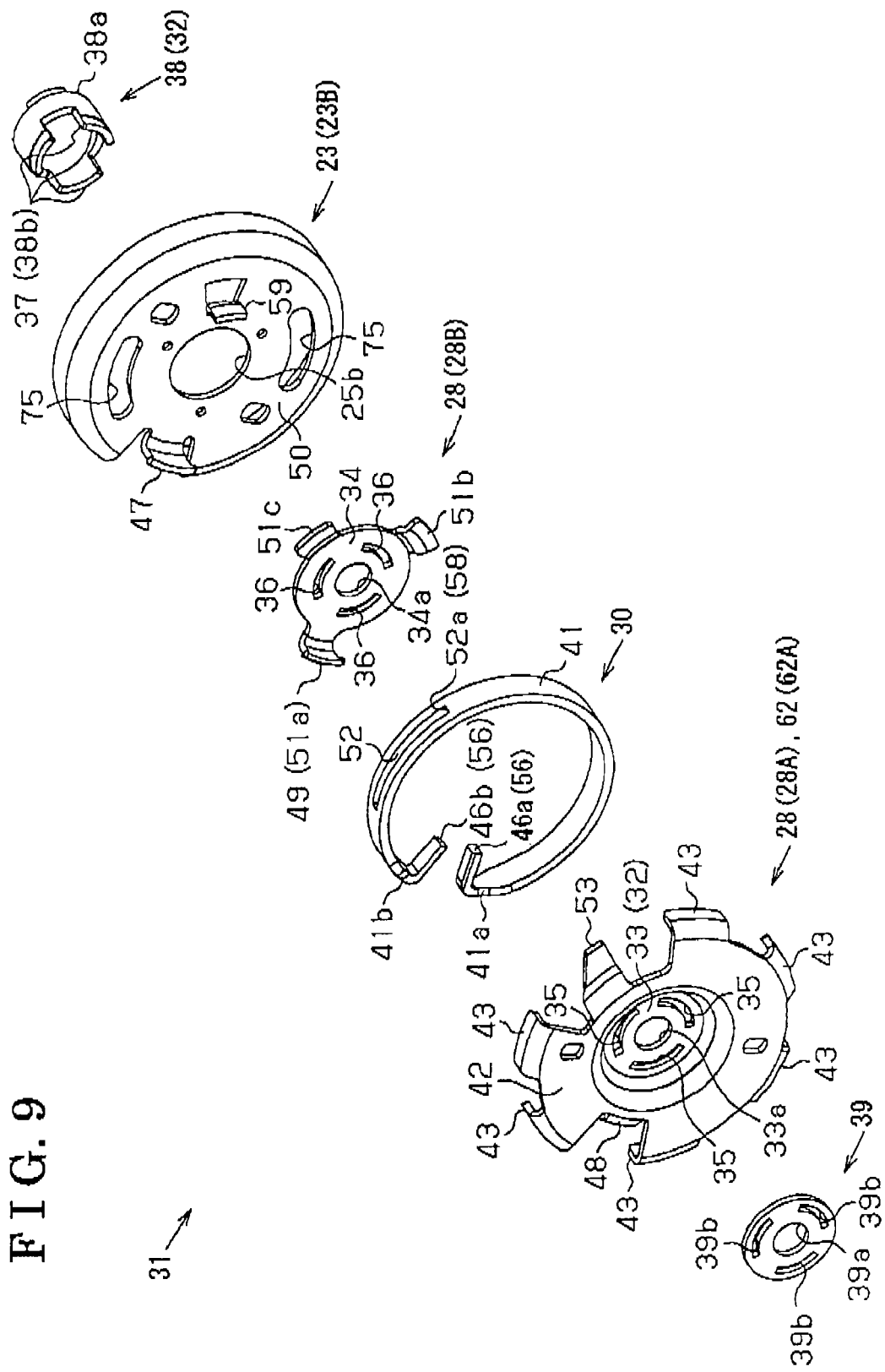
FIG. 9 is an exploded perspective view of a handle returning apparatus according to the first embodiment.

Specifically, as illustrated in FIG. 9, the engagement projecting portion 47 of the second bracket 23B is formed by bending of a portion of a second bracket body 50 towards the first input member 28A, the second bracket body 50 including a substantially disc form and facing the annular portion 42 of the first input member 28A. The engagement projecting portion 48 of the first input member 28A is formed by bending of a portion of the annular portion 42 towards the second bracket 23B. The second input member 28B includes plural projections, specifically, first to third projections 51a, 51b, and 51c projecting radially outwardly from the disc portion 34. The engagement projecting portion 49 of the second input member 28B is formed by bending of an end portion of the first projection 51a towards the first input member 28A.

As illustrated in FIG. 10, the engagement projecting portion 47 of the second bracket 23B is disposed at the most radially outer side among the engagement projecting portions 47 to 49. The engagement projecting portion 49 of the second input member 28B is disposed at the most radially inner side among the engagement projecting portions 47 to 49 in a state where the engagement projecting portion 48 is disposed between the engagement projecting portions 47 and 49.

As illustrated in FIGS. 9 and 10, a bore portion 52 is formed at the spring body 41 of the spring member 30 to penetrate through the spring body 41 in a radial direction thereof. The bore portion 52 is in an elongated form extending in the circumferential direction of the spring body 41. An engagement projecting portion 53 is formed at the first input member 28A to be inserted and positioned within the bore portion 52. Accordingly, the engagement projecting portion 53 inserted to be positioned within the bore portion 52 is in engagement with the spring member 30 in a state where a circumferential end portion 52a of the bore portion 52 serves as the intermediate engagement portion 58 formed between the opposed end portions 41a and 41b of the spring body 41.

Figure 13:
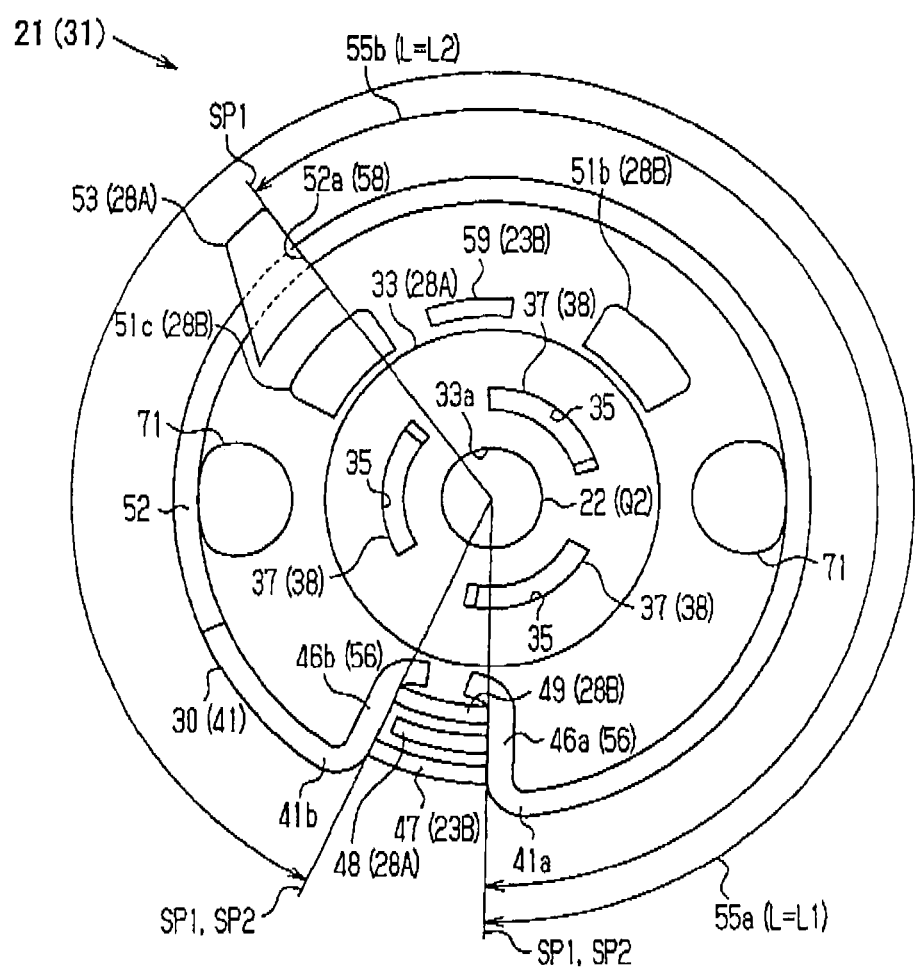
FIG. 13 is an operation explanatory view of the handle returning apparatus in a case where the operation handle is in a neutral position according to the first embodiment.

As illustrated in FIG. 13, in a state where two engagement portions among the engagement portions 56 and 58 formed at the spring body 41 and separating from each other in the circumferential direction are specified as first and second spring end portions (opposed spring end portions) SP1 and SP2, the spring body 41 includes plural spring portions, i.e., first and second spring portions 55a and 55b, including different values of effective spring length L between the spring end portions SP1 and SP2. In the handle returning apparatus 31, based on a condition of rotation operation input to the operation handle 20, either the spring portion 55a or 55b is selected and specified so as to generate the returning force for returning the operation handle 20 to the neutral position P0.

Figure 14:
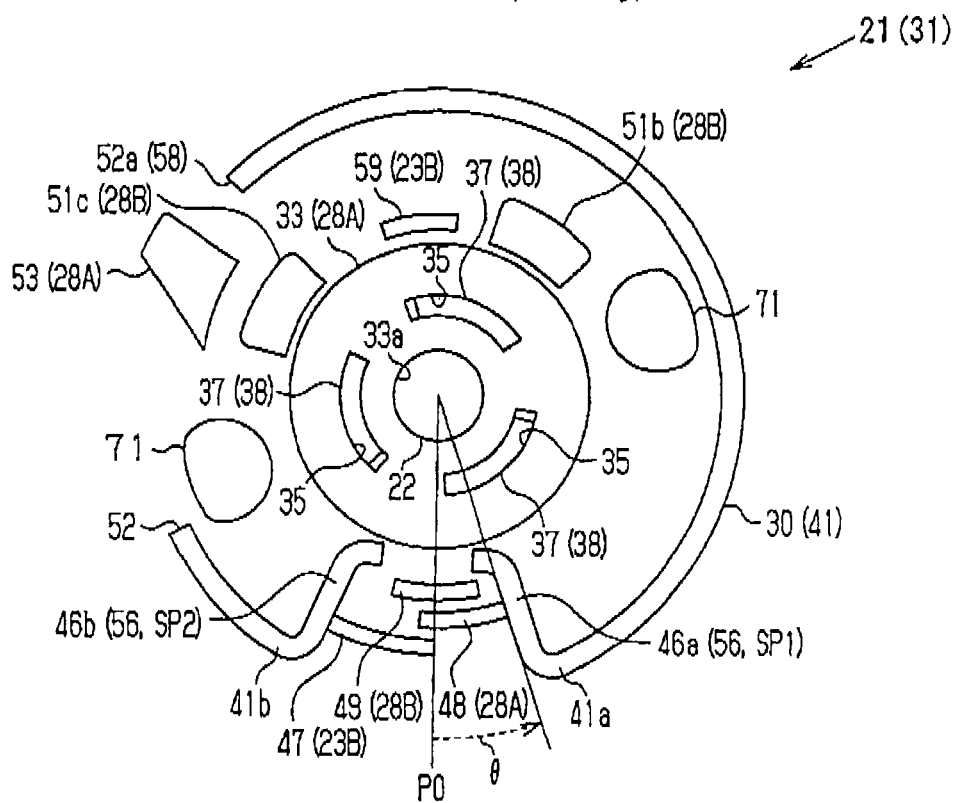
FIG. 14 is an operation explanatory view of the handle returning apparatus in a case where the operation handle is operated to rotate halfway in a first direction according to the first embodiment.
Figure 15:
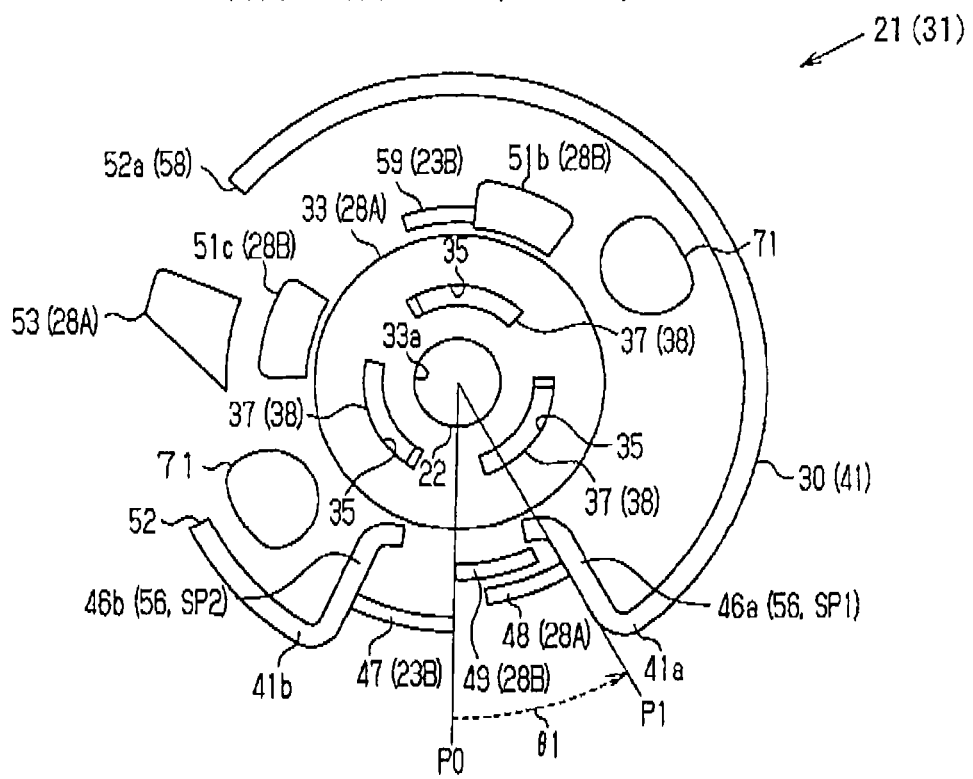
FIG. 15 is an operation explanatory view of the handle returning apparatus in a case where the operation handle is operated to rotate fully in the first direction according to the first embodiment.

As illustrated in FIGS. 14 and 15, in a case where the operation handle 20 is operated in the first direction, the first input member 28A rotates in the counterclockwise direction in FIGS. 14 and 15. At this time, because the rotation position of the first input member 28A relative to the second bracket 23B changes, the engagement projecting portion 47 of the second bracket 23B and the engagement projecting portion 48 of the first input member 28A are separated from each other. Accordingly, the handle returning apparatus 31 is configured so that the engagement projecting portion 47 of the second bracket 23B and the engagement projecting portion 48 of the first input member 28A engage with the first and second bending portions 46a and 46b respectively provided at the opposed end portions 41a and 41b of the spring body 41 and serving as the end engagement portions 56.

Specifically, the engagement projecting portion 48 of the first input member 28A that rotates in conjunction with the operation handle 20 engages with the first bending portion 46a at the first end portion 41a that is disposed in the counterclockwise direction, i.e., in the first direction, relative to the engagement projecting portion 48. The spring member 30 then attempts to rotate, together with the first input member 28A, in the first direction so that the engagement projecting portion 47 of the second bracket 23B engages with the second bending portion 46b at the second end portion 41b that attempts to rotate in the first direction. As a result, the spring member 30 is expanded in a state where the first and second bending portions 46a and 46b are resiliently forced apart from each other.

That is, as illustrated in FIG. 13, in a case where the operation handle 20 is operated to rotate in the first direction, the spring member 30 is configured so that the first spring portion 55a in which the first spring end portion SP1 is formed by the first bending portion 46a of the spring body 41 (i.e., the first end portion 41a at which the first bending portion 46a is provided) while the second spring end portion SP2 is formed by the second bending portion 46b of the spring body 41 (i.e., the second end portion 41b at which the second bending portion 46b is provided) is resiliently deformed. Based on the returning force generated by the first spring portion 55a that is resiliently deformed, the operation handle 20 that is operated in the first direction may be returned to the neutral position P0.

Figure 16:
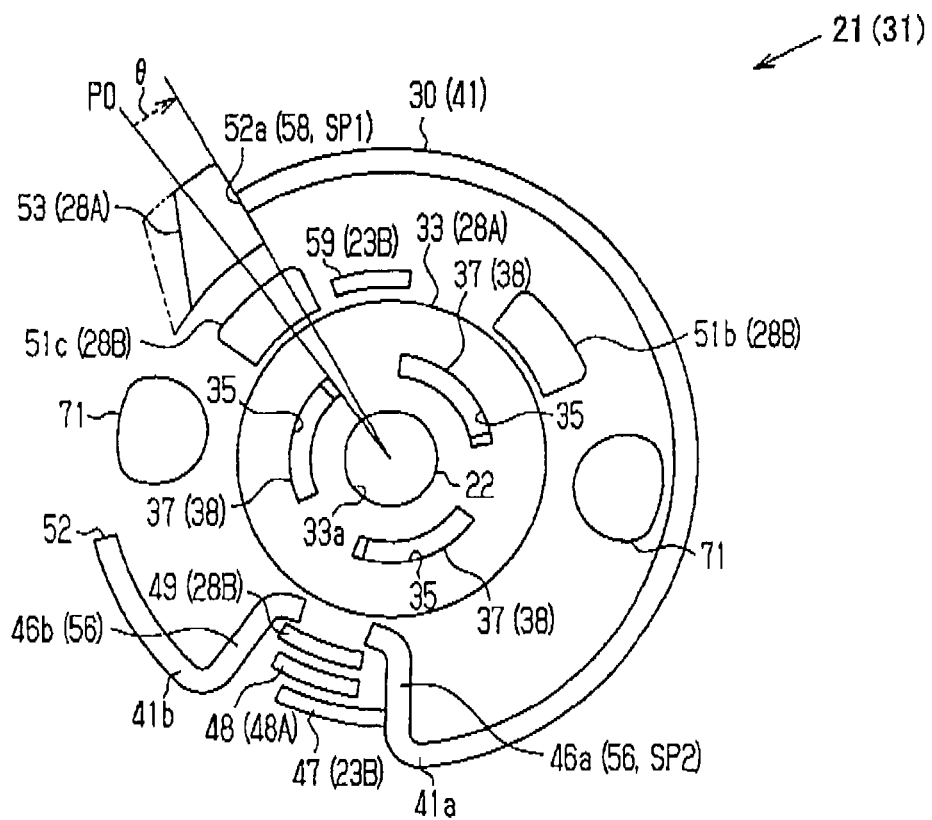
FIG. 16 is an operation explanatory view of the handle returning apparatus in a case where the operation handle is operated to rotate halfway in a second direction according to the first embodiment.
Figure 17:
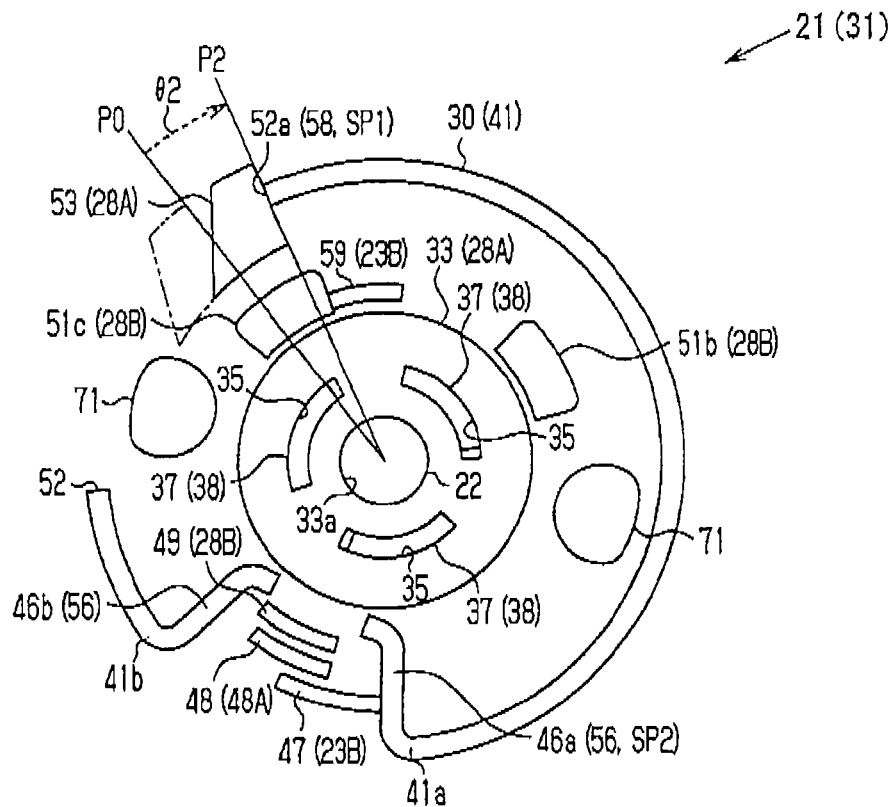
FIG. 17 is an operation explanatory view of the handle returning apparatus in a case where the operation handle is operated to rotate fully in the second direction according to the first embodiment.

On the other hand, as illustrated in FIGS. 16 and 17, in a case where the operation handle 20 is operated in the second direction, the first input member 28A rotates in the clockwise direction in FIGS. 16 and 17. At this time, the engagement projecting portion 53 formed at the first input member 28A is configured to engage with the spring member 30 via the circumferential end portion 52a of the bore portion 52 serving as the intermediate engagement portion 58, the circumferential end portion 52a being positioned in the second direction relative to the engagement projecting portion 53. The spring member 30 thus attempts to rotate, together with the first input member 28A, in the second direction so that the engagement projecting portion 47 of the second bracket 23B engages with the first bending portion 46a at the first end portion 41a that attempts to rotate in the second direction.

That is, as illustrated in FIG. 13, in a case where the operation handle 20 is operated to rotate in the second direction, the spring member 30 is configured so that the second spring portion 55b in which the first spring end portion SP1 is formed by the circumferential end portion 52a of the bore portion 52 constituting the intermediate engagement portion 58 while the second spring end portion SP2 is formed by the first bending portion 46a of the first end portion 41a constituting the end engagement portion 56 is resiliently deformed. Based on the returning force generated by the second spring portion 55b that is resiliently deformed, the operation handle 20 that is operated in the second direction may be returned to the neutral position P0.

In a case where the operation handle 20 is arranged at the neutral position P0, the engagement projecting portion 47 of the second bracket 23B and the engagement projecting portion 49 of the second input member 28B are configured so that circumferentially opposed ends of the engagement projecting portion 47 and circumferentially opposed ends of the engagement projecting portion 49 are disposed and sandwiched between the first and second bending portions 46a and 46b of the spring member 30.

That is, even in a case where the operation handle 20 is not operated, it is configured that the first spring portion 55a in which the first and second spring end portions SP1 and SP2 are formed by the first and second bending portions 46a and 46b of the spring body 41 (i.e., the opposed end portions 41a and 41b at which the first and second bending portions 46a and 46b are provided) constituting the end engagement portions 56 generates the returning force. Accordingly, the handle returning apparatus 31 of the embodiment is configured so that the relative rotation position between the second bracket 23B and the first and second input members 28A and 28B is specified and determined in a case where the operation handle 20 is at the neutral position P0.

In a case where the operation handle 20 is arranged at the neutral position P0, the relative rotation position between the second bracket 238 and the first and second input members 28A and 28B is specified so that, within each of the first engagement bores 35 constituting the connection mechanism 32, the engagement projection 37 is away from the first circumferential end portion 35a with which the engagement projection 37 engages at the time of the rotation operation of the operation handle 20 in the first direction. Accordingly, as illustrated in FIGS. 12A and 12B, the second input member 28B securely rotates in the delayed phase relative to the first input member 28A to which the operation handle 20 is fixed in a case where the operation handle 20 is operated to rotate in the first direction.

Further, as illustrated in FIG. 3, in a case where a maximum operation amount α1 (corresponding to a pull-up position P1) of the operation handle 20 generated when the operation handle 20 is operated in the first direction and a maximum operation amount α2 (corresponding to a pull-down position P2) of the operation handle 20 generated when the operation handle 20 is operated in the second direction are compared with each other, the maximum operation amount α2 is smaller than the maximum operation amount α1.

On the basis of the aforementioned difference, the spring member 30 includes a configuration in which the plural spring portions 55a and 55b are integrally formed in a state where the spring portions 55a and 55b include different values L1 and L2 of the effective spring length L so that different spring forces are specified for the spring portions 55a and 55b. According to the handle returning apparatus 31, the first spring portion 55a generates the returning force in a case where the operation handle 20 is operated in the first direction while the second spring portion 55b generates the returning force in a case where the operation handle 20 is operated in the second direction to thereby apply the appropriate returning force to the operation handle 20 depending on the direction of rotation operation of the operation handle 20.

Specifically, as illustrated in FIG. 13, in comparison between the first and second spring portions 55a and 55b, the effective spring length L2 of the second spring portion 55b in which one of the spring end portions SP1 and SP2 is formed by the intermediate engagement portion 58 is smaller than the effective spring length L1 of the first spring portion 55a in which the spring end portions SP1 and SP2 are formed by the end engagement portions 56 (i.e., L=L2<L1). Accordingly, the second spring portion 55b includes a greater spring force (greater spring constant) than the first spring portion 55a. That is, in a case where the first spring portion 55a serves as a base spring portion, the second spring portion 55b serves as a reinforced spring portion that may generate a greater returning force depending on a resilient deformation amount in the circumferential direction.

The handle returning apparatus 31 is configured so that values of returning force F for returning the operation handle 20 (i.e., returning forces F1 and F2) to the neutral position P0 in a case where the operation handle 20 is operated in the first direction and the second direction are substantially equal to each other (F1≈F2) on a basis of difference in spring forces between the first spring portion 55a and the second spring portion 55b. Accordingly, operation performance of the operation handle 20 is increased and returning performance of the operation handle 20 to the neutral position P0 is enhanced to thereby securely ensure operations of components operating in conjunction with the handle returning apparatus 31.

Figure 18:
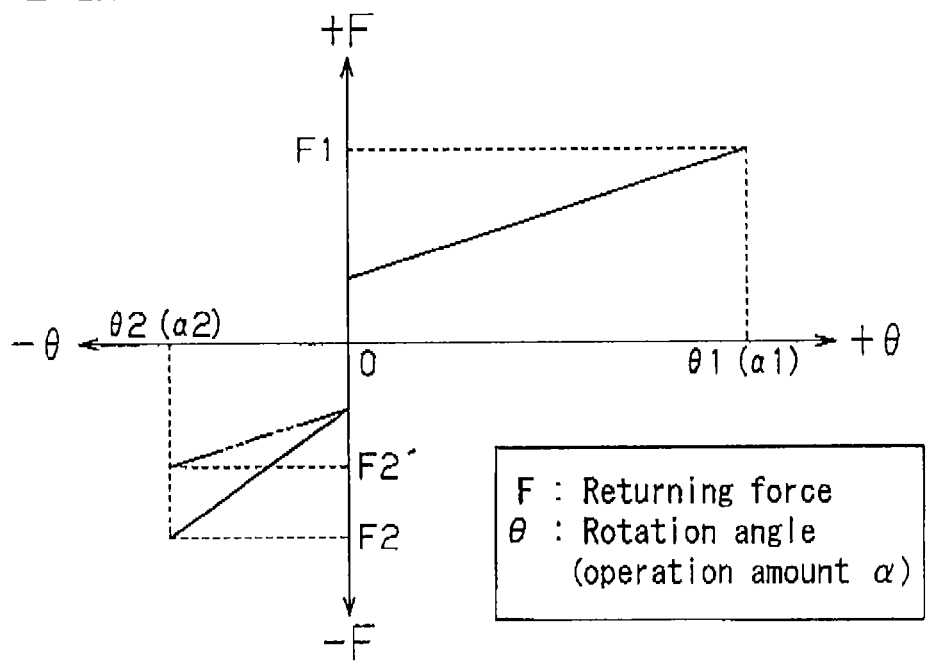
FIG. 18 is an operation explanatory view of the handle returning apparatus according to the first embodiment.

Maximum values of rotation angle θ of the first input member 28A rotating on the basis of the rotation operation of the operation handle 20 in a case where the operation handle 20 is operated in the first direction and the second direction respectively (see FIGS. 15 and 17) are shown as θ1 and θ2 in FIG. 18. A value F2' in FIG. 18 is a maximum value of the returning force obtained in a case where the operation handle 20 is returned to the neutral position P0 based on the returning force F generated by the first spring portion 55a when the operation handle 20 is operated even in the second direction as in a known configuration.

As illustrated in FIGS. 9 to 11, and 13 to 17, the second bracket 23B includes a stopper portion 59 projecting towards the first input member 28A in a state to be positioned at a radially outer side of the second input member 28B, specifically, of the disc portion 34 thereof. The stopper portion 59 is formed by cutting a portion of the second bracket body 50 and lifting-up the cut portion towards the first input member 28A. Either the second projection 51b or the third projection 51c projecting radially outwardly from the disc portion 34 of the second bracket 23B makes contact with the stopper portion 59 to thereby restrict the rotation of the second bracket 23B. That is, the maximum operation amount α1 of the operation handle 20 generated in a case where the operation handle 20 is operated to rotate in the first direction and the maximum operation amount α2 of the operation handle 20 generated in a case where the operation handle 20 is operated to rotate in the second direction (see FIG. 3) are specified.

Next, components of the rotation control apparatus 21 operating in conjunction with the handle returning apparatus 31 will be explained. As illustrated in FIGS. 5, 7, 8, and 19, the rotation control apparatus 21 includes a ratchet wheel 60 integrally rotating with the pinion gear 18 with reference to the common rotation shaft 22. The ratchet wheel 60, which includes a known configuration by including plural engagement teeth (projections) at an outer periphery, is integrally formed with the rotation shaft 22. The pinion gear 18 is also integrally formed with the rotation shaft 22. The ratchet wheel 60 is disposed between the first bracket 23A and the second bracket 23B in the axial direction of the rotation shaft 22.

An operation plate 61 rotatably supported, in the same way as the first and second input members 28A and 28B, by the rotation shaft 22 serving as the support shaft Q2 is disposed between the second bracket 23B and the ratchet wheel 60 in the axial direction of the rotation shaft 22. The operation plate 61 is formed by deformation processing (press-working) of a metallic plate. The operation plate 61 includes a through-hole 61a penetrating through the operation plate 61 in a thickness direction thereof. The operation plate 61 is rotatably supported by the rotation shaft 22 in a state where the rotation shaft 22 is inserted to be positioned within the through-hole 61a.

Figure 20:
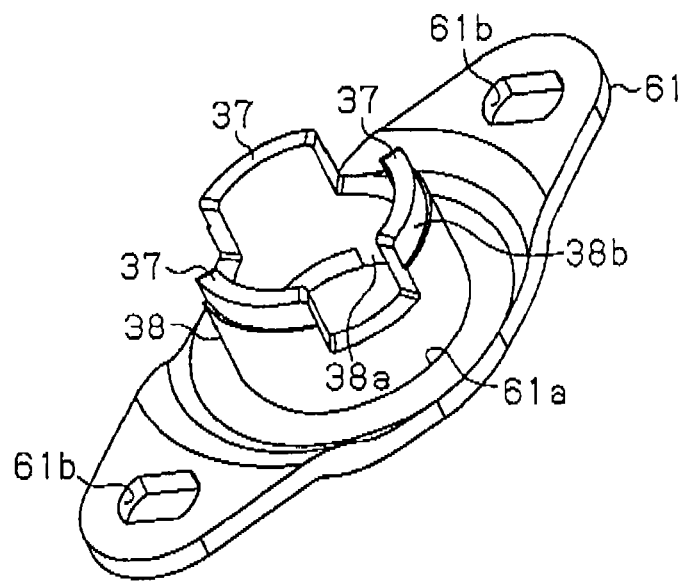
FIG. 20 is a perspective view of an operation plate that constitutes a second operation member and a connection member that constitutes the connection mechanism according to the first embodiment.

As illustrated in FIGS. 7, 8 and 20, the operation plate 61 is connected to a first end portion 38a of the connection member 38 constituting the connection mechanism 32 that connects between the first input member 28A and the second input member 28B so that the torque transmission is obtainable therebetween. The first end portion 38a is substantially formed in a cylinder. Specifically, the first end portion 38a of the connection member 38 is fitted in the through-hole 61a of the operation plate 61 so that the operation plate 61 is connected to the connection member 38 to be relatively non-rotatable. Accordingly, the operation plate 61 is configured to rotate in the delayed phase relative to the first input member 28A that rotates in conjunction with the operation handle 20.

In the embodiment, the first input member 28A fixed to the operation handle 20 constitutes a first operation member 62A while the operation plate 61 fixed to the second input member 28B constitutes a second operation member 62B rotating in the delayed phase relative to the first input member 28A. Based on a relative position change between the first and second operation members 62A and 62B (which will be collectively referred to as an operation member 62) relative to the bracket 23 generated by the rotation operation of the operation handle 20, the rotation control apparatus 21 is configured to control the rotation of the pinion gear 18 of which the rotation shaft (i.e., the rotation shaft 22) is supported by the bracket 23.

Figure 5:
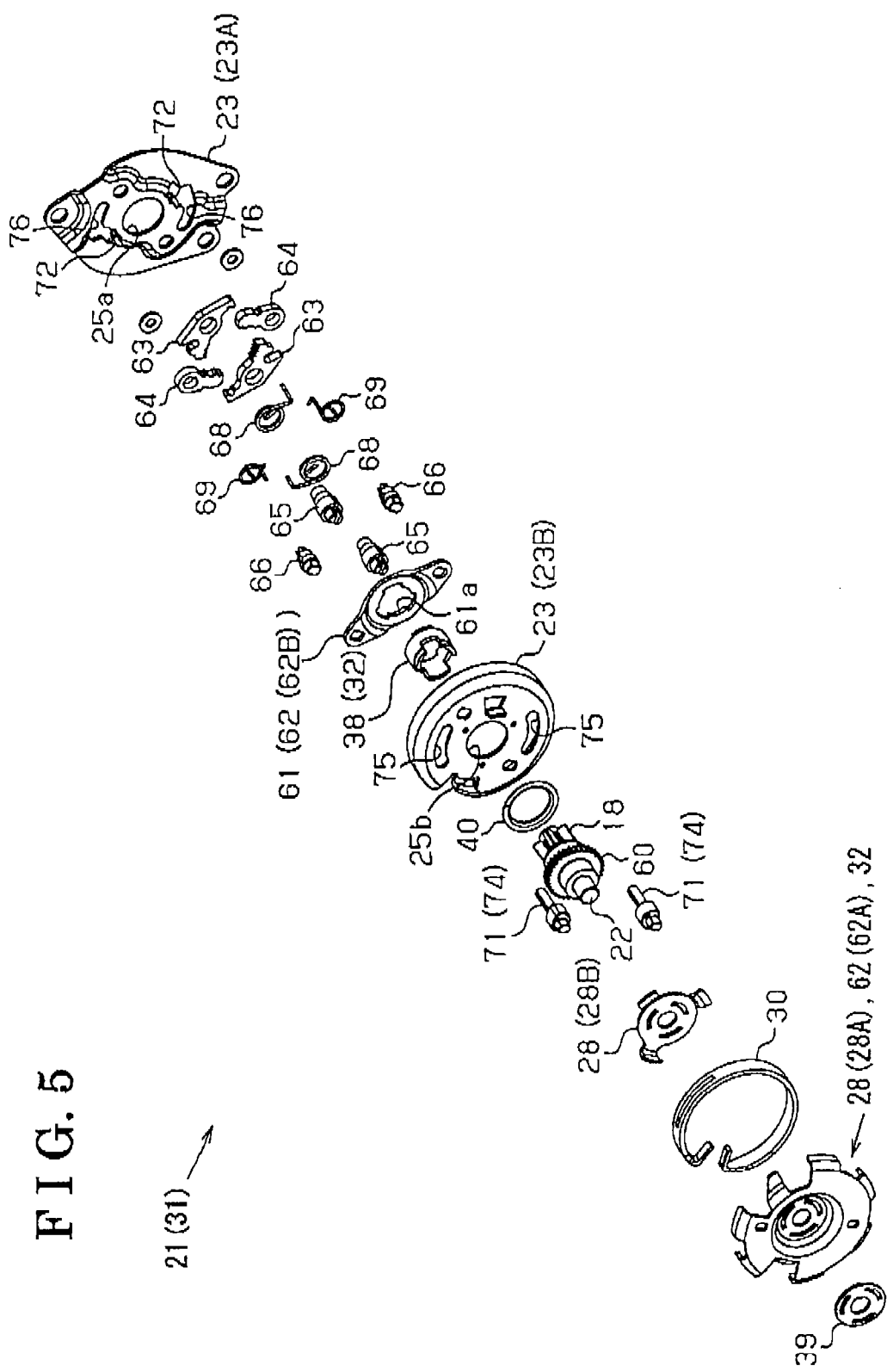
FIG. 5 is an exploded perspective view of the rotation control apparatus according to the first embodiment.
Figure 6:
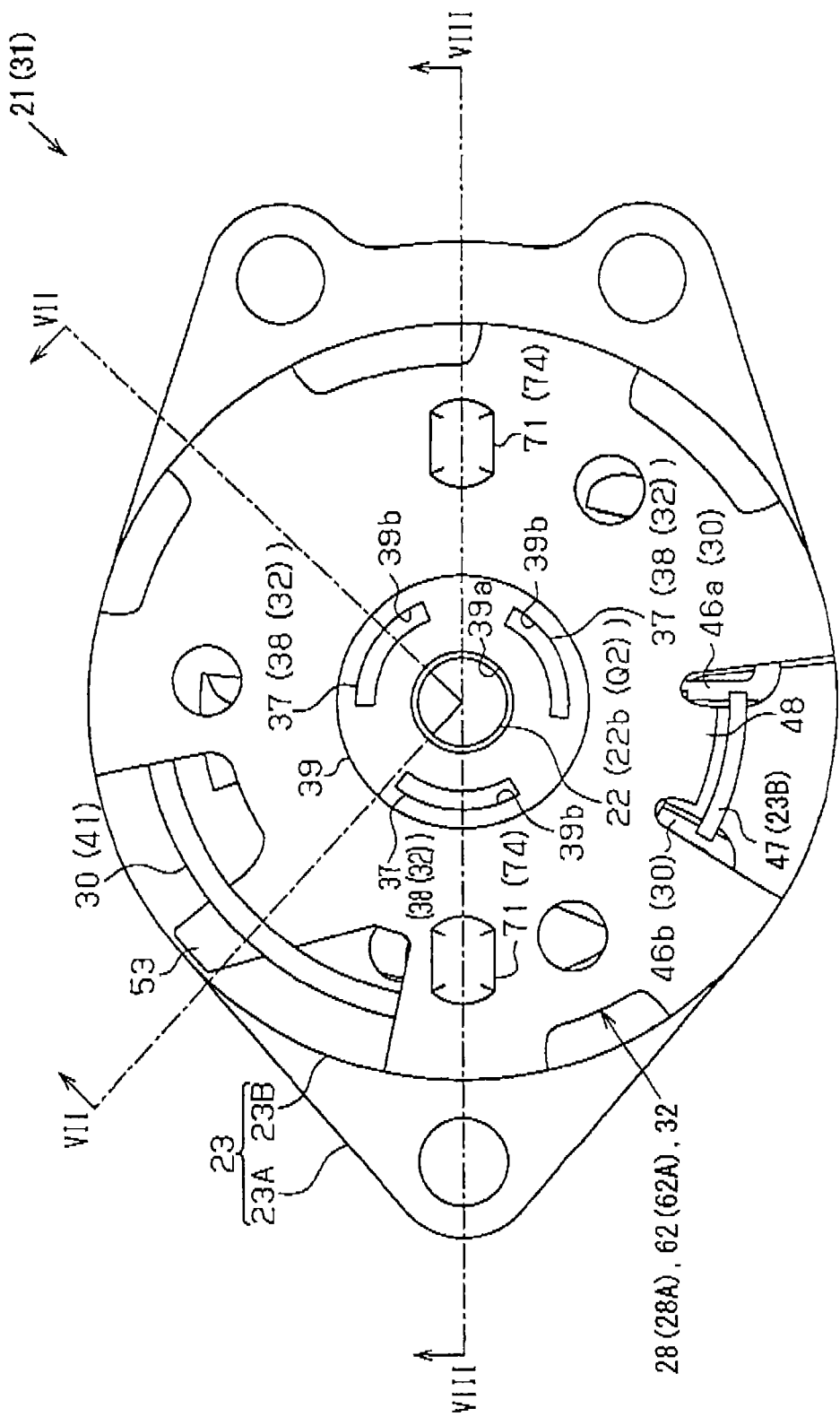
FIG. 6 is a side view of the rotation control apparatus according to the first embodiment.
Figure 19:
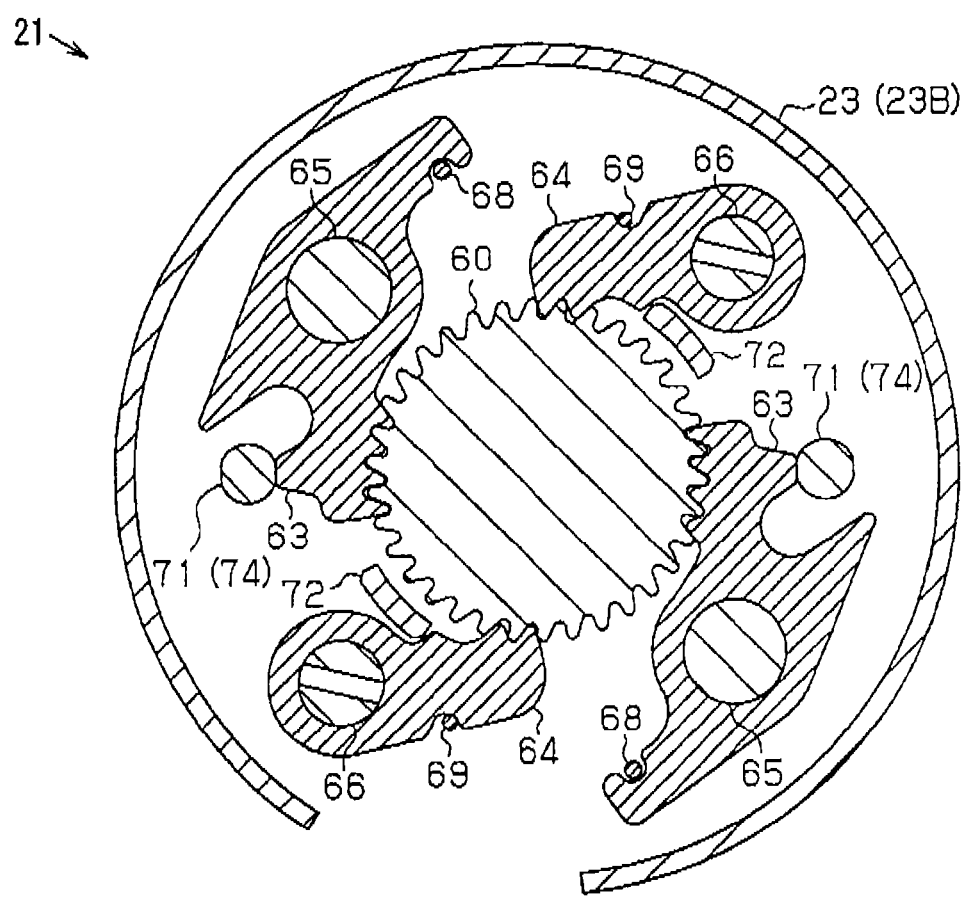
FIG. 19 is a cross-sectional view of the rotation control apparatus taken along line XIX-XIX in FIG. 7.

As illustrated in FIGS. 5, 7, and 19, the rotation control apparatus 21 includes engagement levers 63 and drive levers 64. The engagement levers 63 may restrict the rotation of the pinion gear 18 in a direction where the seat 1 moves downward (i.e., in a direction where the ratchet wheel 60 rotates in the clockwise direction FIG. 19) in a state where the engagement levers 63 engage with the ratchet wheel 60. The drive levers 64 may drive the pinion gear 18 to rotate in a direction where the seat 1 moves upward on a basis of the rotation operation of the operation handle 20 in the first direction in a state where the drive levers 64 integrally rotate with the second operation member 62B while engaging with the ratchet wheel 60.

The rotation control apparatus 21 includes plural support shafts 55, specifically, two support shafts 65 in the embodiment, extending substantially parallel to the rotation shaft 22 in a state where opposed ends of each of the support shafts 65 are supported by the first bracket 23A and the second bracket 23B respectively. The support shafts 65 are provided around the ratchet wheel 60 at even intervals (specifically, at 180-degree intervals in the circumferential direction). The rotation control apparatus 21 includes the plural engagement levers 63, specifically, the two engagement levers 63 in the embodiment, which are rotatably provided at the radially outer side of the ratchet wheel 60 in a state where the engagement levers 63 are supported by the respective support shafts 65.

The rotation control apparatus 21 also includes plural support shafts 66, specifically, two support shafts 66 in the embodiment, extending substantially in parallel to the rotation shaft 22 towards the first bracket 23A in a state where one end of each of the support shafts 66 is fixed to the operation plate 61 that constitutes the second operation member 62B. The support shafts 66 are also provided around the ratchet wheel 60 at even intervals (specifically, at 180-degree intervals in the circumferential direction).

One axial ends of the respective support shafts 66 are fitted to respective fitting bores 61b (see FIG. 20) formed at the operation plate 61 so that the support shafts 66 are fixed to the operation plate 61.

In a state where the operation handle 20 is returned to the neutral position P0 as illustrated in FIG. 19, each of the support shafts 66 is arranged to be displaced by 90 degrees relative to each of the support shafts 65 provided at the bracket 23 in the circumferential direction. The rotation control apparatus 21 includes the plural drive levers 64, specifically, the two drive levers 64 in the embodiment, which are rotatably provided at the radially outer side of the ratchet wheel 60 in a state where the drive levers 64 are supported by the respective support shafts 66.

Figure 21:
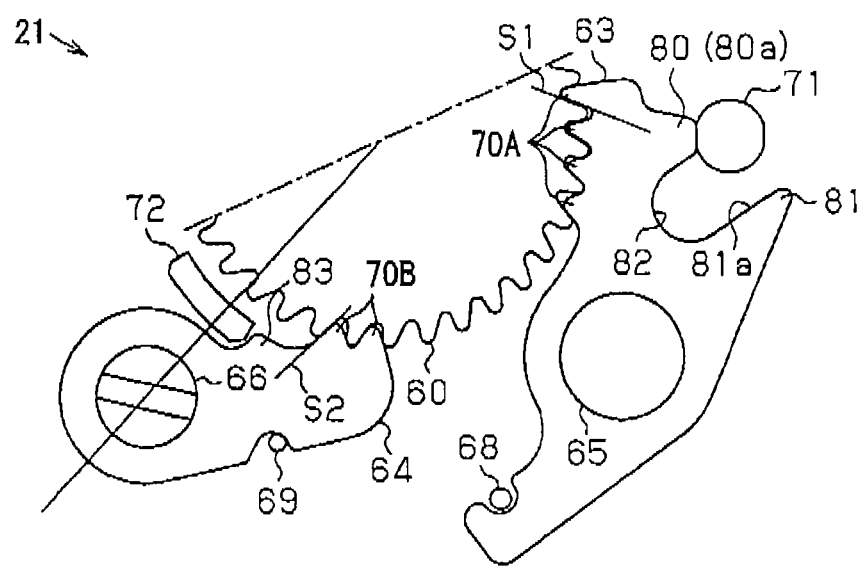
FIG. 21 is an operation explanatory view of the rotation control apparatus in a case where the operation handle is in the neutral position according to the first embodiment.

Torsion coil springs 68 serving as biasing members are fitted to the respective support shafts 65 while torsion coil springs 69 serving as the biasing members are fitted to the respective support shafts 66. As illustrated in FIG. 21, each of the engagement levers 63 and each of the drive lever 64 are biased to rotate in a direction where engagement teeth 70A formed at an end of the engagement lever 63 and engagement teeth 70B formed at an end of the drive lever 64 engage with the engagement teeth of the ratchet wheel 60 (i.e., in the counterclockwise direction in FIG. 19) based on biasing forces of the torsion coil springs 68 and 69.

Each of the support shafts 65 at the engagement lever 63 is disposed in a direction orthogonal to an engagement surface S1 between the engagement teeth 70A of the engagement lever 63 and the engagement teeth of the ratchet wheel 60, specifically, in a substantially normal direction of the engagement surface S1 at a side for restricting the rotation of the ratchet wheel 60. Accordingly, a pressure angle is defined for restricting the rotation of the ratchet wheel 60 in the clockwise direction in FIG. 21, i.e., the rotation of the pinion gear 18 in a direction where the seat 1 moves downward.

In the same manner, each of the support shafts 66 at the drive lever 64 is disposed in a direction orthogonal to an engagement surface S2 between the engagement teeth 70B of the drive lever 64 and the engagement teeth of the ratchet wheel 60, specifically, in a substantially normal direction of the engagement surface S2 at a side for restricting the rotation of the ratchet wheel 60. Accordingly, a pressure angle is defined for driving and rotating the ratchet wheel 60 in the counterclockwise direction in FIG. 21.

The first operation member 62A and the second operation member 62B rotate in the counterclockwise direction in FIG. 13 based on the rotation operation of the operation handle 20 in the first direction for pulling up or lifting up the operation handle 20 (see FIG. 3). At this time, the drive levers 64, which integrally rotate with the operation plate 61 constituting the second operation member 62B, move, together with the support shafts 66, along the outer periphery of the ratchet wheel 60 in the counterclockwise direction in FIG. 19. Accordingly, the drive levers 64 may drive the ratchet wheel 60 in engagement with the drive levers 64 to rotate in the counterclockwise direction in FIG. 19, i.e., in a direction where the seat 1 moves upward.

In addition, in a case where the ratchet wheel 60 rotates in an opposite direction from the direction in which the rotation of the ratchet wheel 60 is restricted by the engagement levers 63, i.e., in a direction where the seat 1 moves upward, the engagement teeth 70A of each of the engagement levers 63 are configured to slide or slip on the engagement surface S1. In the same way, in a case where the drive levers 64 circumferentially move around the ratchet wheel 60 in an opposite direction from the direction in which the drive levers 64 drive and rotate the ratchet wheel 60 (i.e., in the clockwise direction in FIG. 19), the engagement teeth 70B of each of the drive levers 64 are configured to slide or slip on the engagement surface S2. Accordingly, each of the engagement levers 63 and the drive levers 64 constitutes a ratchet mechanism relative to the ratchet wheel 60.

As illustrated in FIGS. 5, 8, and 19, the rotation control apparatus 21 includes engagement lever control pieces 71 and drive lever control pieces 72. The engagement lever control pieces 71 are configured to release the engagement of the engagement levers 63 relative to the ratchet wheel 60 based on the rotation operation of the operation handle 20 in the second direction for pulling down or pressing down the operation handle 20. The drive lever control pieces 72 are configured to release the engagement of the drive levers 64 relative to the ratchet wheel 60.

The engagement lever control pieces 71 and the drive lever control pieces 72 are configured so that a relative position of each of the engagement lever control pieces 71 relative to the corresponding engagement lever 63 serving as a control target of the engagement lever control piece 71 and a relative position of each of the drive lever control pieces 72 relative to the corresponding drive lever 84 serving as a control target of the drive lever control piece 72 are changed in the circumferential direction in a case where the first and second operation members 62A and 62B and the bracket 23 rotate relative to each other on the basis of the rotation operation input to the operation handle 20. In a case where the operation handle 20 is operated to rotate in the second direction, the engagement lever control pieces 71 and the drive lever control pieces 72 press the engagement levers 63 and the drive levers 64 respectively, thereby rotating the engagement levers 63 and the drive levers 64 in a direction to separate from the ratchet wheel 60 (in the clockwise direction in FIG. 19).

As illustrated in FIGS. 5 and 8, each of the engagement lever control pieces 71 is constituted by an axial member 74 of which an end portion 74a projects in the axial direction of the rotation shaft 22 towards the first bracket 23A (i.e., downward in FIG. 8). The second bracket body 50 of the second bracket 23B includes plural elongated bores 75 extending in the circumferential direction. The engagement lever control pieces 71 are inserted to be positioned within the respective elongated bores 75 so as to integrally rotate with the first operation member 62A without interfering with the second bracket 23B.

The first bracket 23A also includes plural elongated bores 76 extending in the circumferential direction in the same way as the elongated bores 75 formed at the second bracket body 50. End portions of the engagement lever control pieces 71 (i.e., the end portions 74a of the axial members 74) are inserted to be positioned within the respective elongated bores 76. As a result, based on the relative rotation of the first operation member 62A relative to the bracket 23, the engagement lever control pieces 71 move at the radially outer side of the ratchet wheel 60 in the circumferential direction in a state to be guided by the respective elongated bores 76.

As illustrated in FIGS. 5, 8, and 19, the drive lever control pieces 72 are provided at the first bracket 23A. Each of the drive lever control pieces 72 is formed by cutting a portion of the first bracket 23A and lifting up the portion towards the second bracket 23B so that an end of the drive lever control piece 72 projects towards the second bracket 23B (i.e., upward in FIG. 8). The drive lever control pieces 72 are disposed between the ratchet wheel 60 and the support shafts 66 of the drive levers 64 at the radially outer side of the ratchet wheel 60. Accordingly, the drive levers 64 are configured to apparently move in the circumferential direction at the radially outer side than the drive lever control pieces 72 based on the relative rotation of the second operation member 62B relative to the bracket 23.

As illustrated in FIG. 19, the engagement lever control pieces 71 are configured to make contact with the respective engagement levers 63 that are in engagement with the ratchet wheel 60 in a case where the operation handle 20 is arranged at the neutral position P0. Accordingly, the engagement lever control pieces 71 are configured to restrict the rotation of the pinion gear 18 in the direction where the seat 1 moves upward by restricting the movement of the engagement levers 63 to separate from the ratchet wheel 60, i.e., the rotation of each of the engagement levers 63 in the clockwise direction in FIG. 19.

Specifically, as illustrated in FIG. 21, each of the engagement levers 63 includes a restriction projection 80 projecting radially outwardly relative to the ratchet wheel 60 in the engagement state with the ratchet wheel 60. In a case where the operation handle 20 is arranged at the neutral position P0, each of the engagement lever control pieces 71 makes contact with an end 80a of the restriction projection 80.

Figure 22:
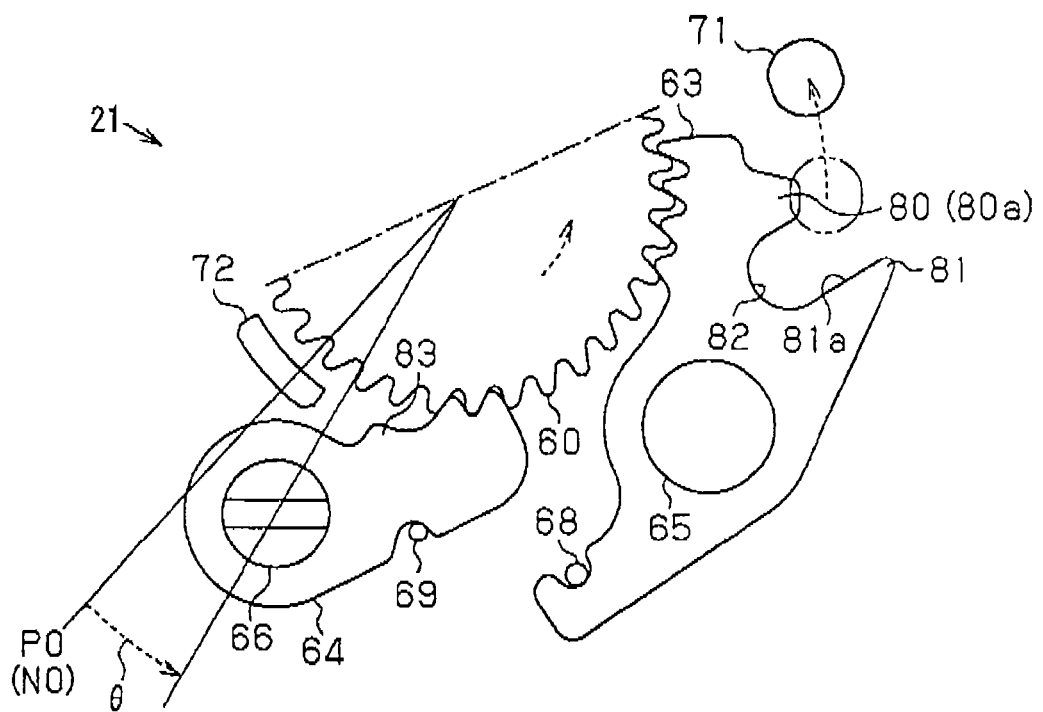
FIG. 22 is an operation explanatory view of the rotation control apparatus in a case where the operation handle is operated to rotate halfway in the first direction.

As illustrated in FIG. 22, each of the engagement lever control pieces 71 circumferentially moves in the counterclockwise direction in FIG. 22 at the radially outer side of the ratchet wheel 60 by integrally rotating with the first operation member 62A in a case where the operation handle 20 is operated in the first direction for lifting up the operation handle 20. Then, the engagement lever control piece 71 separates from the end 80a of the restriction projection 80 so that the rotation of each of the engagement levers 63 is permitted. That is, in a case where the pinion gear 18 rotates in the direction where the seat 1 moves upward during the rotation operation of the operation handle 20 in the first direction, each of the engagement levers 63 is allowed to rotate to thereby separate from the ratchet wheel 60.

At this time, the first operation member 62A is configured to rotate prior to the second operation member 62B. The second operation member 62B at which the support shafts 66 of the drive levers 64 are provided is brought to a state in which the rotation torque in the first direction is transmitted to the second operation member 62B by the engagement of the engagement projections 37 of the connection member 38 constituting the connection mechanism 32 relative to the first circumferential end portions 35a of the first engagement bores 35 formed at the first operation member 62A (the first input member 28A) as illustrated in FIG. 12A. Accordingly, the second operation member 62B rotates in the delayed phase relative to the first operation member 62A so that, after the engagement lever control piece 71 separates from the restriction projection 80 of the engagement lever 63 as illustrated in FIG. 22, the drive lever 64 that integrally rotates with the second operation member 62B drives and rotates the ratchet wheel 60 in engagement with the drive lever 64.

Figure 23:
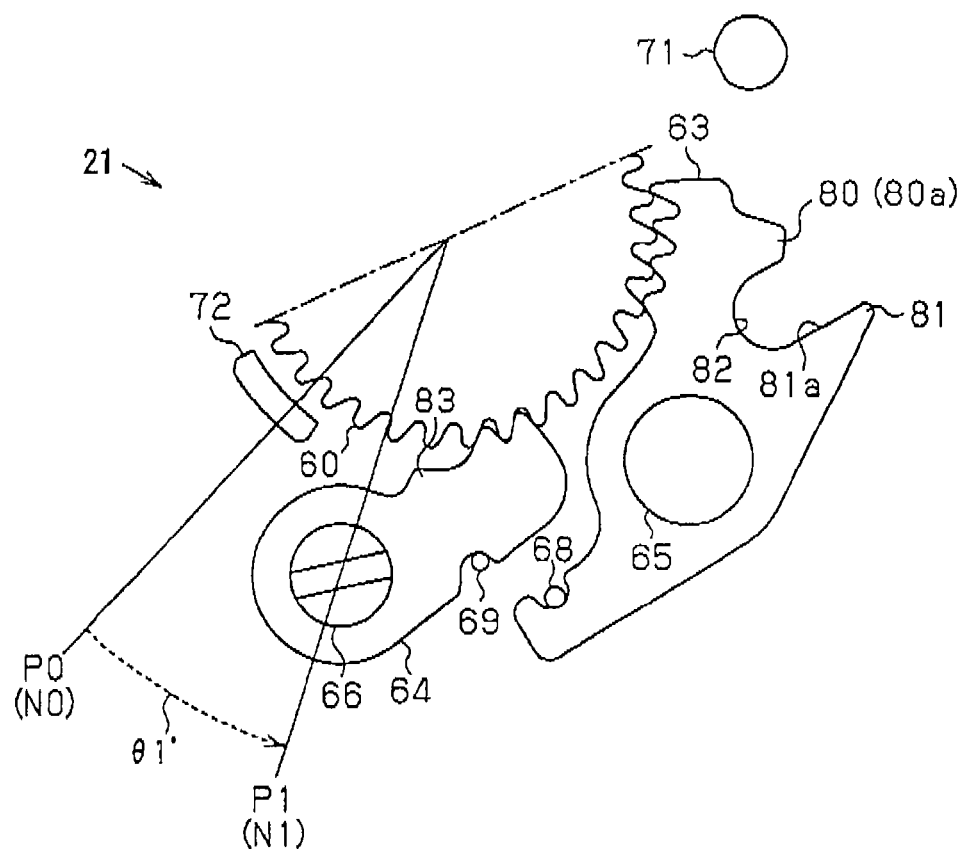
FIG. 23 is an operation explanatory view of the rotation control apparatus in a case where the operation handle is operated to rotate fully in the first direction.

As illustrated in FIG. 23, each of the drive levers 64 circumferentially moves around the ratchet wheel 60 in the counterclockwise direction in FIG. 23 from a position N0 corresponding to the neutral position P0 to a position N1 corresponding to the pull-up position P1 in a case where the operation handle 20 is operated to rotate from the neutral position P0 to the pull-up position P1 (see FIG. 3). At this time, the rotation angle θ of the first input member 28A is a value θ1'. By one time operation of pulling-up the operation handle 20 by a user, the pinion gear 18 integrally rotating with the ratchet wheel 60 via the rotation shaft 22 may be driven to rotate by an amount corresponding to two pieces of engagement teeth of the ratchet wheel 60.

In a case where the operation handle 20 in the lifted-up state is returned to the neutral position P0, i.e., in a return operation of the operation handle 20, the rotation of the pinion gear 18 in the direction in which the seat 1 moves downward is restricted by the engagement levers 63 engaging with the ratchet wheel 60. At this time, because the drive levers 64 circumferentially move around the ratchet wheel 60 in the opposite direction from the direction to drive and rotate the ratchet wheel 60, the operation of each of the drive levers 64 to separate from the ratchet wheel 60 is permitted. Accordingly, while maintaining the rotation position of the ratchet wheel 60 that is driven to rotate by the amount corresponding to the two pieces of engagement teeth of the ratchet wheel 60 by one-time operation of pulling up the operation handle 20, each of the drive levers 64 is configured to return to the position N0 corresponding to the neutral position P0 from the position N1 corresponding to the pull-up position P1.

As illustrated in FIG. 21, each of the engagement levers 63 includes a pressing projection 81 projecting further radially outwardly of the ratchet wheel 60 than the restriction projection 80. In the embodiment, each of the engagement lever control pieces 71 may be in contact with each of the engagement levers 63 in a case where the engagement lever control piece 71 is arranged at a specific movement position, i.e., in a limited case where the operation handle 20 is arranged at the neutral position P0, by the contact of the engagement lever control piece 71 with the end 80a of the restriction projection 80 projecting radially outwardly of the ratchet wheel 60. Nevertheless, on the other hand, in a case where the operation handle 20 is positioned at other than the neutral position P0, the engagement lever control piece 71 may be difficult to make contact with the engagement lever 63.

Figure 24:
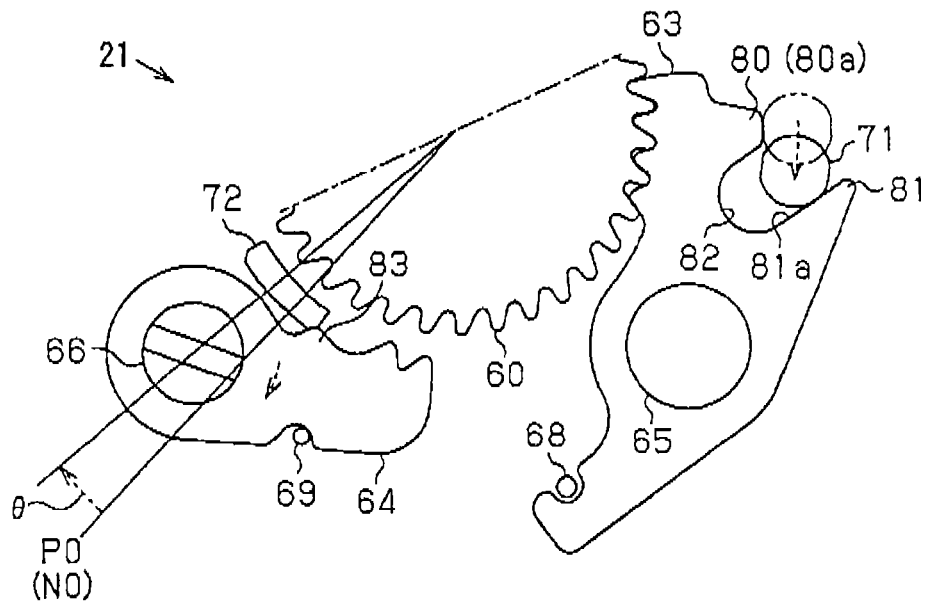
FIG. 24 is an operation explanatory view of the rotation control apparatus in a case where the operation handle is operated to rotate halfway in the second direction.
Figure 25:
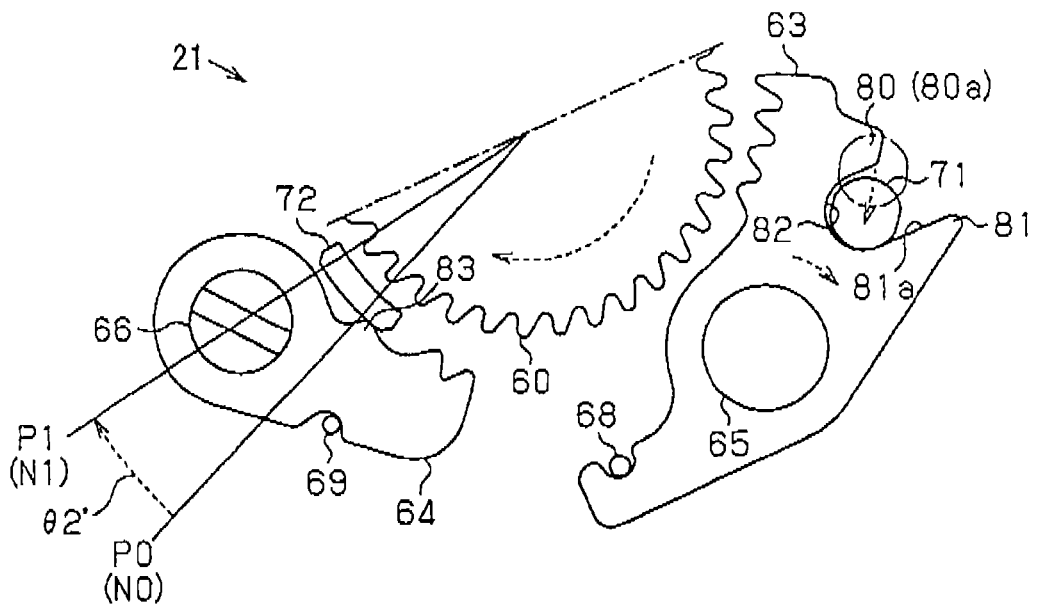
FIG. 25 is an operation explanatory view of the rotation control apparatus in a case where the operation handle is operated to rotate fully in the second direction.

In the light of the foregoing, as illustrated in FIGS. 24 and 25, the pressing projection 81 is formed to extend in a direction intersecting with a movement locus of the engagement lever control piece 71 that moves at the radially outer side of the ratchet wheel 60. In a case where the operation handle 20 is operated in the second direction for pulling-down the operation handle 20, the pressing projection 81 is pressed by the engagement lever control piece 71 so that the engagement lever 63 securely rotates in a direction separating from the ratchet wheel 60 (i.e., in the clockwise direction in FIGS. 24 and 25).

In each of the engagement levers 63, a groove portion 82 is formed between the restriction projection 80 and the pressing projection 81. In a case where the operation handle 20 is pulled downward, the engagement lever control piece 71 that moves in the circumferential direction is configured to enter the groove portion 82.

Specifically, the engagement lever 63 is rotated by the engagement lever control piece 71 pressing a side wall 81a of the pressing projection 81 that is continuously formed with the groove portion 82. Accordingly, in the rotation control apparatus 21, the engagement levers 63 are configured to separate from the ratchet wheel 60 during the rotation operation of the operation handle 20 from the neutral position P0 to the pull-down position P2 (see FIG. 3). At this time, the rotation angle θ of the first input member 28A is a value θ2'.

The rotation control apparatus 21 is configured so that, based on the rotation operation of the operation handle 20 in the second direction for pressing-down the operation handle 20, each of the drive levers 64 circumferentially moves at the radially outer side of the ratchet wheel 60 and the drive lever control piece 72 provided at the first bracket 23A makes contact with the drive lever 64 at the radially inner side. Accordingly, the drive lever 64 that is pressed by the drive lever control piece 72 rotates in the clockwise direction in FIGS. 24 and 25 so as to separate from the ratchet wheel 60 during the rotation operation of the operation handle 20 from the neutral position P0 to the pull-down position P2.

At this time, a holding engagement portion 83 is formed at the drive lever 64. The holding engagement portion 83 engages with the drive lever control piece 72 that presses the drive lever 64 during the pull-down operation of the operation handle 20 so as to hold a state where the drive lever 64 is separated from the ratchet wheel 60.

Figure 26A:
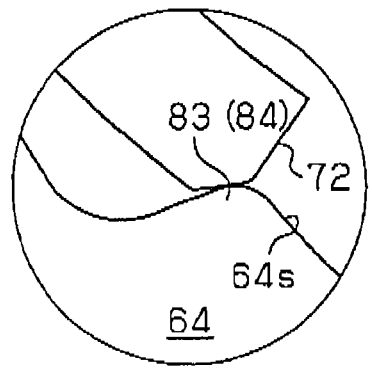
FIGS. 26A and 26B are operation explanatory views each of which illustrates a holding engagement portion provided at a drive lever according to the first embodiment.
Figure 26B:
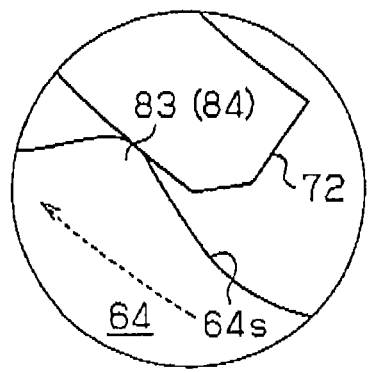

Specifically, as illustrated in FIGS. 26A and 26B, the drive lever control piece 72 in contact with the drive lever 64 slides on a contact surface 64s of the drive lever 64 while pressing the drive lever 64. At this time, the drive lever 64 that integrally rotates with the second operation member 62B actually moves from a right side to a left side in FIGS. 26A and 26B. Accordingly, the drive lever control piece 72 apparently slides on the contact surface 64s from the left side to the right side in FIGS. 26A and 26B.

The holding engagement portion 83 forms a step portion 84, across which the drive lever control piece 72 may move, on the contact surface 64s. The drive lever control piece 72 at a position where the drive lever control piece 72 moves across the step portion 84 from the left side to the right side in FIGS. 26A and 26B engages with the holding engagement portion 83. The state where the engagement between the drive lever 64 and the ratchet wheel 60 is released may be thus maintained.

The engagement between the drive lever control piece 72 and the holding engagement portion 83 is released by the drive lever control piece 72 moving across the step portion 84 formed by the holding engagement portion 83 from the right side to the left side in FIGS. 26A and 26B during the return operation of the operation handle 20 to the neutral position P0. The state where the drive lever 64 and the ratchet wheel 60 are engaged with each other is then achieved.

The operation of the seat lifting apparatus 10 including the rotation control apparatus 21 that is configured in the aforementioned manner will be explained. As illustrated in FIG. 21, each of the engagement levers 63 engages with the ratchet wheel 60 in a state where the operation handle 20 is at the neutral position P0 (see FIG. 3). Accordingly, the rotation of the ratchet wheel 60, i.e., the rotation of the pinion gear 18 that integrally rotates with the ratchet wheel 60 via the rotation shaft 22, is restricted in the direction in which the seat 1 moves downward.

At this time, the engagement lever control piece 71 makes contact with the engagement lever 63 to restrict the engagement lever 63 from separating from the ratchet wheel 60. Accordingly, the rotation of the pinion gear 18 in the direction where the seat 1 moves upward is restricted. The position of the seat 1 supported by the link mechanism 12 is thus stably maintained in the up-down direction.

As illustrated in FIGS. 22 and 23, in the rotation operation of the operation handle 20 in the first direction for pulling-up the operation handle 20, each of the drive levers 64 integrally provided with the second operation member 62B circumferentially moves at the radially outer side of the ratchet wheel 60 in the counterclockwise direction in FIGS. 22 and 23. Accordingly, the drive lever 64 drives the ratchet wheel 60 in engagement with the drive lever 64 to rotate in the direction where the seat 1 moves upward.

At this time, the second operation member 62B rotates in the delayed phase relative to the first operation member 62A. Thus, each of the engagement lever control pieces 71 separates from each of the engagement levers 63 before the drive lever 64 drives to rotate the ratchet wheel 60. In a state where each of the engagement levers 63 is disengageable from the ratchet wheel 60, the drive lever 64 starts driving and rotating the ratchet wheel 60.

Further, at the time of the return operation for returning the operation handle 20 in the lifted-up state to the neutral position P0, the engagement levers 63 in engagement with the ratchet wheel 60 restrict the rotation of the pinion gear 18 in the direction to move the seat 1 downward. At this time, each of the drive levers 64 circumferentially moves at the radially outer side of the ratchet wheel 60 in the opposite direction from the direction in which the drive lever 64 drives and rotates the ratchet wheel 60, thereby allowing the operation of the drive lever 64 to separate from the ratchet wheel 60. Accordingly, in a state where the rotation position of the ratchet wheel 60 that is driven to rotate by the amount corresponding to the two pieces of engagement teeth of the ratchet wheel 60 by one time operation of pulling-up the operation handle 20 is maintained, the drive lever 64 is returned from the position N1 corresponding to the pull-up position P1 to the position N0 corresponding to the neutral position P0.

According to the seat lifting apparatus 10 of the embodiment, the operation for pulling-up the operation handle 20 from the neutral position P0 (i.e., input operation) by the rotation of the operation handle 20 in the first direction and the return operation for returning the operation handle 20 to the neutral position P0 in the lifted-up state are repeated so as to upwardly move the seat 1 supported by the link mechanism 12.

On the other hand, as illustrated in FIGS. 24 and 25, each of the engagement lever control pieces 71 that circumferentially moves at the radially outer side of the ratchet wheel 60 in the clockwise direction in FIGS. 24 and 25 presses the engagement lever 63 to thereby separate the engagement lever 63 from the ratchet wheel 60 in a case where the operation handle 20 is operated in the second direction for pushing-down the operation handle 20. At this time, each of the drive levers 64 circumferentially moves at the radially outer side of the ratchet wheel 60 in the clockwise direction in FIGS. 24 and 25 to make contact with the drive lever control piece 72 that is arranged at the radially inner side of the drive lever 64. The drive lever 64 is pressed by the drive lever control piece 72 so as to separate from the ratchet wheel 60.

According to the seat lifting apparatus 10 of the embodiment, the operation for pressing-down the operation handle 20 (to the pull-down position P2) from the neutral position P0 (i.e., input operation) by the rotation of the operation handle 20 in the second direction is maintained to thereby allow the rotation of the pinion gear 18. Thus, the seat 1 supported by the link mechanism 12 is movable downward.

According to the aforementioned embodiment, the handle returning apparatus 31 includes the input member 28 (the first and second input members 28A and 28B) rotating in conjunction with the operation handle 20, and the spring member 30 including the first and second spring portions 55a and 55b which are integrally formed to include different spring forces and to extend around the support shaft Q2 of the input member 28. Each of the first and second spring portions 55a and 55b generates the returning force for returning the operation handle 20 to the neutral position P0 by biasing the input member 28 based on the rotation operation of the operation handle 20 in a state where one of the opposed spring end portions SP1 and SP2, the opposed spring end portions SP1 and SP2 being separated from each other in the circumferential direction, engages with the input member 28 while the other of the opposed spring end portions SP1 and SP2 engages with the bracket 23 (specifically, the second bracket 23B) so that the spring portions 55a and 55b are resiliently deformed. The handle returning apparatus 31 is configured so that either the first spring portion 55a or the second spring portion 55b is selected and specified to generate the returning force depending on conditions (for example, direction) of the rotation operation of the operation handle 20.

According to the aforementioned configuration, the appropriate returning force may be generated by a simple structure depending on the conditions of the rotation operation of the operation handle 20. As a result, appropriate operation performance of the operation handle 20 may be ensured. In addition, by enhancing the returning performance of the operation handle 20 to the neutral position P0, the components of the rotation control apparatus 21 operating in conjunction with the operation handle 20 may be arranged at appropriate positions at the neutral position P0. Accordingly, the secure operation of the rotation control apparatus 21 may be obtained.

Because the first and second spring portions 55a and 55b are integrally formed as the single spring member 30, one of the spring portions 55a and 55b in engagement with the input member 28 to generate the returning force operates in conjunction with the other of the spring portions 55a and 55b. Accordingly, engagement relationship between the spring portions 55a and 55b, and the input member 28 may be easily changed. The returning force generated on a basis of the conditions of the rotation operation of the operation handle 20 may be thus accurately specified.

The spring member 30 includes the plural spring portions 55a and 55b including different values of effective spring length L from each other (i.e., effective spring lengths L1 and L2) between the opposed spring end portions SP1 and SP2. Accordingly, the plural spring portions 55a and 55b including different effective spring forces and extending around the support shaft Q2 may be easily integrally formed. The spring force of each of the spring portions 55a and 55b may be easily and accurately specified on a basis of the effective spring length L. Further, one of the opposed spring end portions SP1 and SP2 may be arranged at a different position in the circumferential direction from the other of the opposed spring end portions SP1 and SP2. The engagement relationship between the spring portions 55a and 55b, and the input member 28 may be further easily changed. Accordingly, the appropriate returning force depending on the conditions of the rotation operation of the operation handle 20 may be simply and accurately generated.

In the embodiment, the spring member 30 includes the reinforced spring portion (i.e., the second spring portion 55b) in which one of the opposed spring end portions SP1 and SP2 is formed by the intermediate engagement portion 58 formed between the opposed end portions 41a and 41b of the spring body 41 extending around the support shaft Q2.

Accordingly, without applying a large change to the configuration of the spring body 41, the reinforced spring portion including a large spring force may be obtained with a simple configuration. By the usage of the reinforced spring portion, the returning force that may be generated is enhanced.

The intermediate engagement portion 58 is obtained by the bore portion 52 formed at the spring body 41. Accordingly, the intermediate engagement portion 58 may be formed easily with a simple configuration. In addition, the spring member 30 includes the spring portion 55a for generating the returning force in a case where the operation handle 20 is operated to rotate in the first direction, and the spring portion 55b for generating the returning force in a case where the operation handle 20 is operated to rotate in the second direction.

Accordingly, the appropriate returning force based on the direction of the rotation operation of the operation handle 20 may be generated. The operation performance of the operation handle 20 may be appropriately secured. The improved returning performance of the operation handle 20 to the neutral position P0 may achieve the secure operation of the rotation control apparatus 21 include components which operate in conjunction with the rotation operation of the operation handle 20.

In the embodiment, the operation handle 20 is provided at a side of the seat 1 in a width direction thereof so as to be rotatable and operable in the up-down direction. That is, for the operation handle 20 of the seat lifting apparatus 10 that is rotatably operated in the up-down direction at the side of the seat 1, it may be difficult to specify a large rotation operation amount for the pressing-down operation of the operation handle 20. Nevertheless, because of the aforementioned configurations, the reinforced spring portion (the second spring portion 55b) including a large spring force is configured to engage with the input member 28, thereby generating a large returning force with a small rotation operation amount. Accordingly, the operation performance of the operation handle 20 may be appropriately secured and the improved returning performance of the operation handle 20 to the neutral position P0 may achieve the secure operation of the rotation control apparatus 21 including the components operating in conjunction with the operation handle 20.

A handle returning apparatus provided at a seat lifting apparatus for a vehicle according to a second embodiment will be explained with reference to the attached drawings. The same configurations of the second embodiment as those of the first embodiment bear the same reference numerals and explanation will be omitted.

Figure 27:
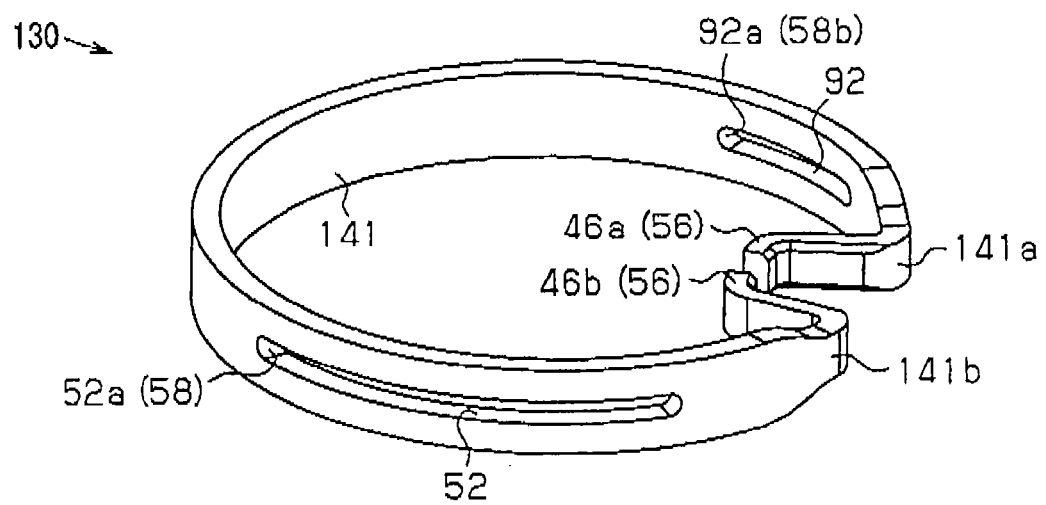
FIG. 27 is a perspective view of a spring member according to a second embodiment disclosed here.
Figure 28:
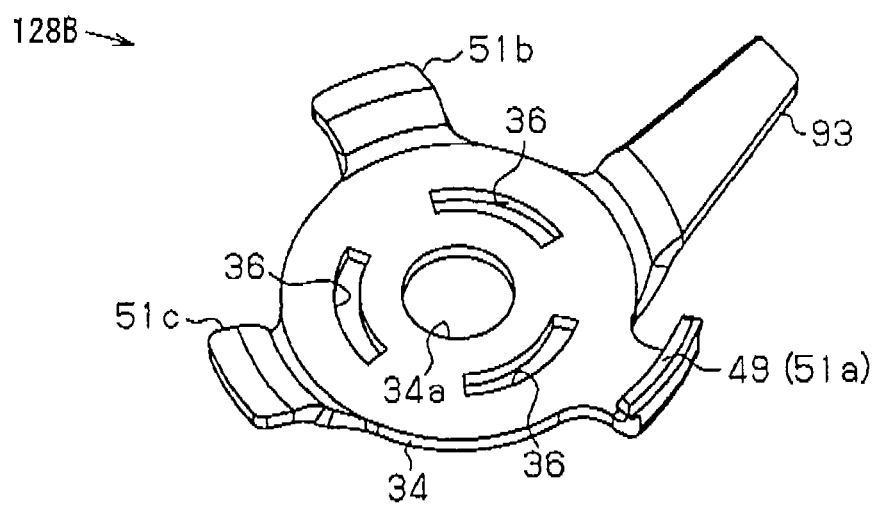
FIG. 28 is a perspective view of a second input member according to the second embodiment.
Figure 29:
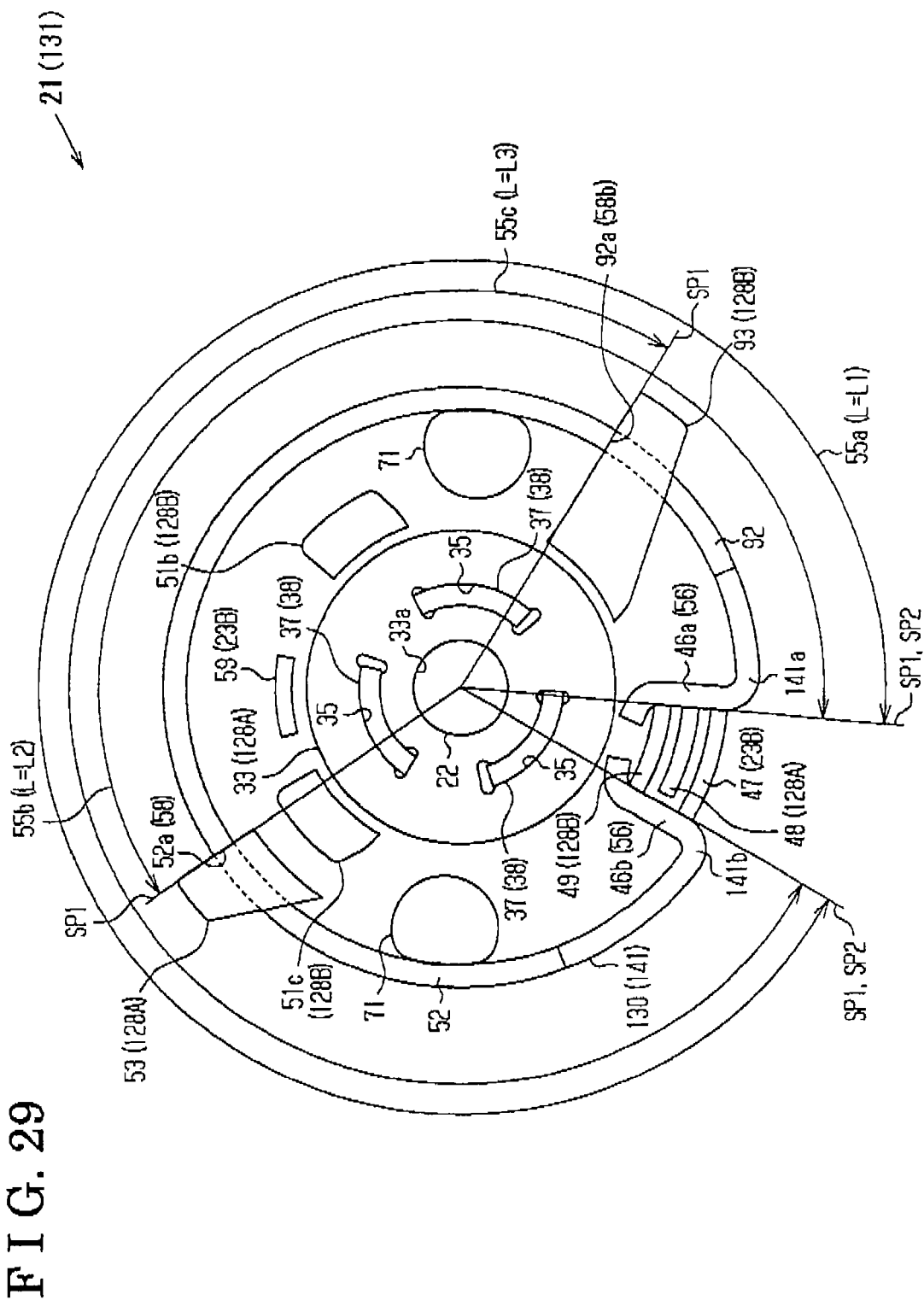
FIG. 29 is an operation explanatory view of a handle returning apparatus in a case where the operation handle is in the neutral position according to the second embodiment.

As illustrated in FIGS. 27 to 29, a spring member 130 constituting a handle returning apparatus 131 includes plural bore portions penetrating through a spring body 141 of the spring member 130 in a radial direction thereof. In the spring member 130, the spring body 141 includes the bore portion 52 into which the engagement projecting portion 53 formed at the first input member 28A is inserted so that the circumferential end portion 52a of the bore portion 52 constitutes the intermediate engagement portion 58 in the same way as the spring member 30 of the first embodiment. The spring member 130 also includes a bore portion 92 at a position in the circumferential direction of the spring body 141 different from the position at which the bore portion 52 is formed.

Specifically, the bore portion 52 is formed closer to a second end portion 141b in the circumferential direction of the spring body 141. On the other hand, the bore portion 92 is formed closer to a first end portion 141a in the circumferential direction of the spring body 141. The bore portion 92 is also in an elongated form extending in the circumferential direction. The length of the bore portion 92 in the circumferential direction is specified to be shorter than the bore portion 52.

In the second embodiment, a second input member 128B includes an engagement projection 93 inserted to be positioned within the bore portion 92. The handle returning apparatus 131 of the second embodiment is configured so that the engagement projection 93 inserted to the bore portion 92 engages with the spring member 130 via a circumferential end portion 92a of the bore portion 92 serving as a second intermediate engagement portion 58b based on the rotation operation of the operation handle 20.

Specifically, as illustrated in FIG. 29, the spring member 130 of the second embodiment includes a third spring portion 55c in which one of the opposed spring end portions SP1 and SP2 is formed by the second intermediate engagement portion 58b that is obtained by the bore portion 92. In the same way as the second spring portion 55b in which one of the opposed spring end portions SP1 and SP2 is formed by the second intermediate engagement portion 58b that is obtained by the bore portion 52, because of the short effective spring length L3, the third spring portion 55c serves as the reinforced spring portion that may generate a greater returning force than a returning force generated by the first spring portion 55a serving as the base spring portion in which the opposed spring end portions SP1 and SP2 are formed by the end engagement portions 56. In the handle returning apparatus 131 of the second embodiment, one of the spring portions 55a, 55b, and 55c is selected and specified (i.e., the spring portions 55a, 55b, and 55c are switchable therebetween) on a basis of the conditions of the rotation operation input to the operation handle 20 so as to generate the returning force for returning the operation handle 20 to the neutral position P0.

Figure 30:
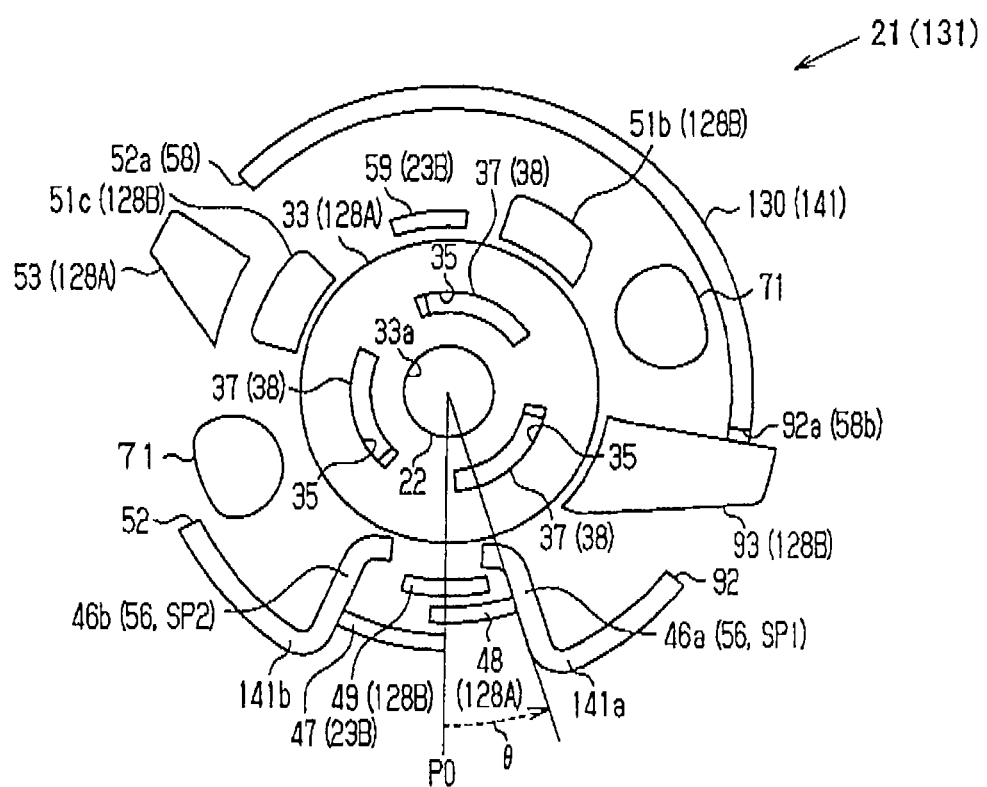
FIG. 30 is an operation explanatory view of the handle returning apparatus in a case where the operation handle is operated to rotate from the neutral position (i.e., input operation) according to the second embodiment.
Figure 31:
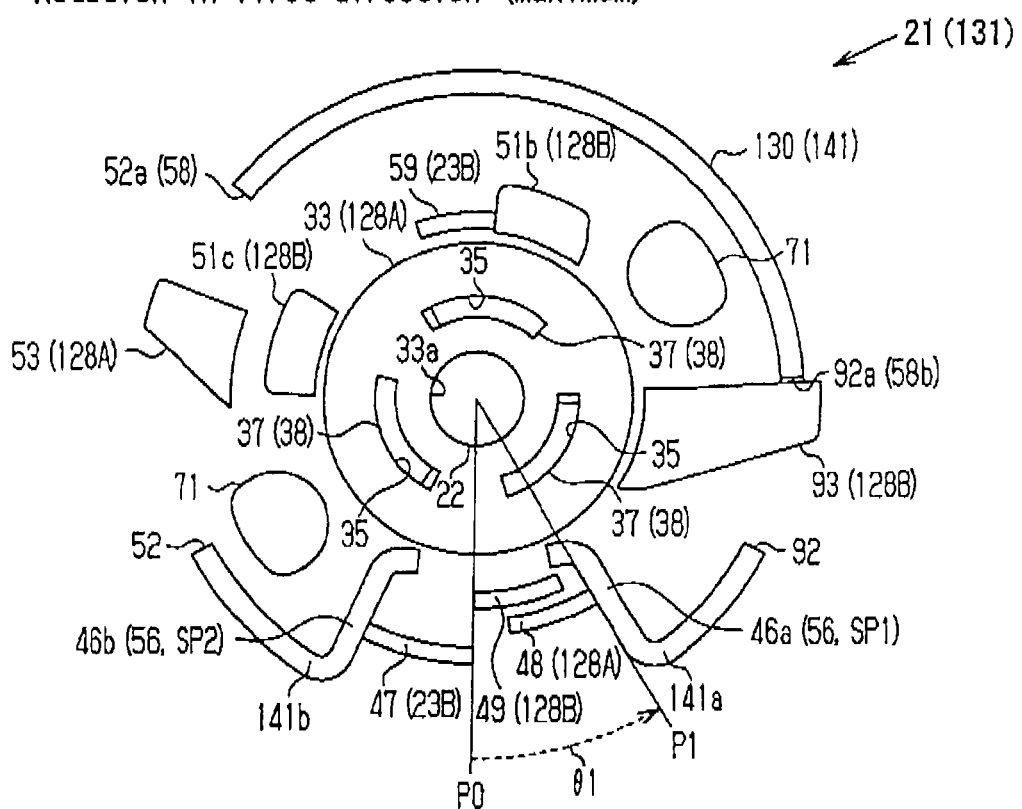
FIG. 31 is an operation explanatory view of the handle returning apparatus in a case where the operation handle is operated to rotate fully in the second direction.

As illustrated in FIGS. 30 and 31, in a case where the operation handle 20 is operated in the first direction so as to be pulled upward from the neutral position P0 (i.e., in the input operation), it is configured that the first spring portion 55a generates the returning force for returning the operation handle 20 to the neutral position P0 in the same way as the first embodiment.

At this time, the second input member 128B rotates in the delayed phase relative to a first input member 128A serving as the first engagement body. Thus, before the engagement projection 93 formed at the second input member 128B makes contact with the circumferential end portion 92a of the bore portion 92 constituting the second intermediate engagement portion 58b, the engagement projecting portion 48 formed at the first input member 128A engages with the end engagement portion 56 at the first end portion 141a. As a result, the spring member 130 is pressed in the counterclockwise direction in FIGS. 30 and 31, i.e., in the first direction, so that the engagement projection 93 and the circumferential end portion 92a of the bore portion 92 are separated from each other. In the handle returning apparatus 131 of the second embodiment, the aforementioned separate state between the engagement projection 93 and the circumferential end portion 92a of the bore portion 92 is configured to be maintained at the pull-up position P1 at which the maximum operation amount α1 of the operation handle 20 in the first direction is generated.

Figure 32:
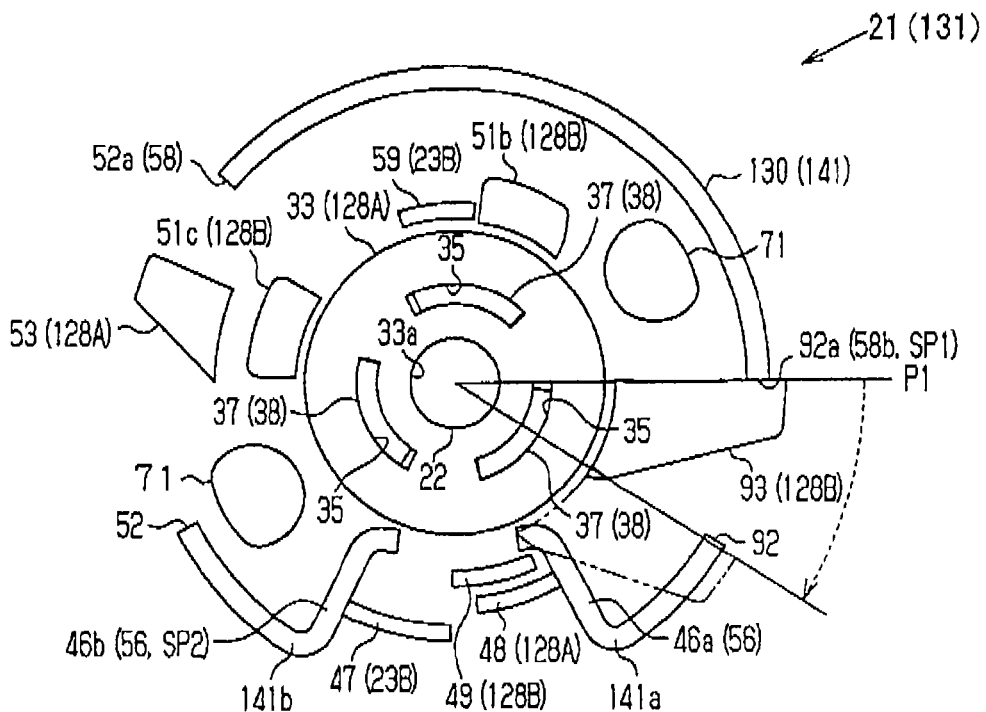
FIG. 32 is an operation explanatory view of the handle returning apparatus in a case where the operation handle is operated to return to the neutral position (i.e., return operation) according to the second embodiment.

On the other hand, in a case where the rotation operation for pulling-up the operation handle 20 is stopped as illustrated in FIG. 32, the first and second input members 128A and 128B rotate in the clockwise direction in FIG. 32, i.e., in the second direction, based on the returning force generated by the spring member 130.

At this time, the handle returning apparatus 131 is configured so that the engagement projection 93 provided at the second input member 128B makes contact with the circumferential end portion 92a of the bore portion 92 into which the engagement projection 93 is inserted. That is, in the return operation for returning the operation handle 20 to the neutral position P0, the third spring portion 55c in which the first spring end portion SP1 is formed by the second intermediate engagement portion 58b that is obtained by the bore portion 92 and the second spring end portion SP2 is formed by the end engagement portion 56 at the second end portion 141b of the spring body 141 is resiliently deformed. Based on the returning force of the third spring portion 55c that is resiliently deformed, the operation handle 20 is returned to the neutral position P0.

In a case where the operation handle 20 is operated in the second direction, in the same way as the first embodiment, the second spring portion 55b in which the first spring end portion SP1 is formed by the intermediate engagement portion (first intermediate engagement portion) 58 that is obtained by the bore portion 52 and the second spring end portion SP2 is formed by the end engagement portion 56 at the first end portion 141a generates the returning force for returning the operation handle 20 to the neutral position P0.

Figure 33:
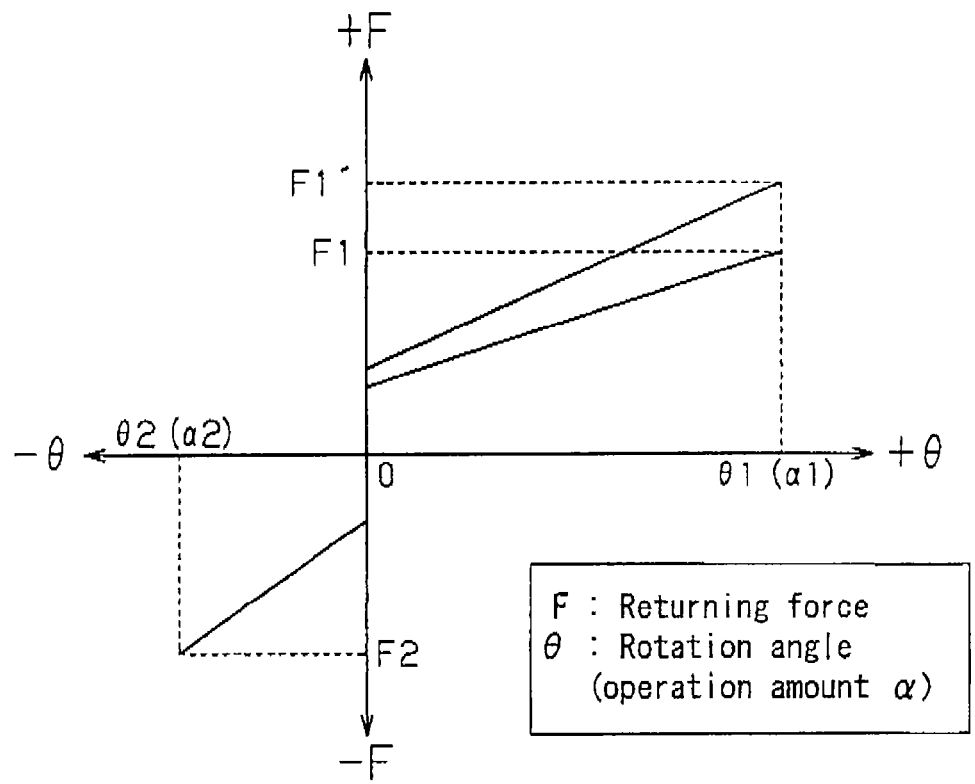
FIG. 33 is an operation explanatory view of the handle returning apparatus according to the second embodiment.

Next, the operation of the handle returning apparatus 131 in the second embodiment configured in the aforementioned manner will be explained. As illustrated in FIG. 33, in the return operation for returning the operation handle 20 that is operated to rotate in the first direction to the neutral position P0, the third spring portion 55c including the short effective spring length L3 and constituted as the reinforced spring portion including the greater spring force (L=L3<L1) is utilized to thereby generate the greater returning force F. In FIG. 33, a value F1 is a maximum value of the returning force F obtained in the input operation of the operation handle 20 in which the first spring portion 55a is utilized. A value F1' is a maximum value of the returning force F in the return operation of the operation handle 20 in which the third spring portion 55c is utilized (F1'>F1). Accordingly, the returning performance of the operation handle 20 to the neutral position P0 is enhanced so as to highly accurately specify the relative position between the first input member 128A and the second input member 128B at the neutral position P0. Each of the components of the rotation control apparatus 21 is returned to an appropriate position to ensure the accurate operation thereof.

In the second embodiment, the returning force F1 in the input operation for rotating the operation handle 20 from the neutral position P0 and the returning force F1' in the return operation for returning the operation handle 20 to the neutral position P0 are specified to be different from each other. As a result, the operation performance of the operation handle 20 may be ensured.

In addition, as in the rotation control apparatus 21 constituting the seat lifting apparatus 10, in a case where the components are operated on the basis of the returning force F generated by the spring member 130 in the return operation of the operation handle 20, the relative position between the first and second input members 128A and 128B may be further accurately specified by the enhancement of the returning force F1' for the return operation. Each of the components of the rotation control apparatus 21 is returned to the appropriate position, thereby securing the accurate operation.

In the first and second embodiments, the operation handle 20 is fixed to the first input member 28A, 128A. The first and second input members 28A, 128A and 28B, 128B integrally rotate with the operation handle 20 based on the rotation operation of the operation handle 20. Alternatively, the operation handle 20 and the input member 28 may be connected to each other via a gear, for example. The operation handle 20 and the input member 28 (the first and second input members 28A, 128A and 28B, 128B) may not be necessarily arranged to be coaxial with each other.

In the embodiments, the rotation operation of the operation handle 20 for pulling up the operation handle 20 is defined to be the rotation operation in the first direction, and the rotation operation of the operation handle 20 for pulling down the operation handle 20 is defined to be the rotation operation in the second direction. At this time, however, the first direction and the second direction are not limited to the up-down direction. For example, the operation handle 20 may be operated in a right-left direction or a front-rear direction.

In the first embodiment, the handle returning apparatus 31 includes the first and second input members 28A and 28B. At this time, however, the number of input member 28 rotating in conjunction with the operation handle 20 may be one, or more than three.

In the first and second embodiments, the bracket 23 (specifically, the second bracket 23B) serves as the fixation member with which either of the opposed spring end portions SP1 and SP2 engages. Alternatively, the other component or member than the bracket 23 may serves as the fixation member. In a case where the bracket 23 serves as the fixation member, the shape or configuration thereof may be appropriately changed.

In the embodiments, the first input member 28A, 128A at which the first engagement bores 35 are formed serves as the first engagement body while the connection member 38 connected to the second input member 28B, 128B serves as the second engagement body to thereby constitute the connection mechanism 32. Alternatively, the first engagement body including the engagement bore may be provided at the second input member 28B, 128B while the second engagement body including the engagement projection may be provided at the first input member 28A, 128A. Further alternatively, the first engagement body and the second engagement body formed separately and individually from the first input member 28A, 128A and the second input member 28B, 128B may form the connection mechanism 32. The numbers and configurations of the first engagement bores 35 and the engagement projections 37 may be appropriately changed. As long as the first input member 28A, 128A, and the second input member 28B, 128B are connected so that torque transmission therebetween is achievable, and one of the first input member 28A, 128A, and the second input member 28B, 128B is rotatable in the delayed phase relative to the other of the first input member 28A, 128A, and the second input member 28B, 128B, the connection mechanism 32 may be formed by other configurations than the engagement between the first engagement bores 35 and the engagement projections 37.

In the embodiments, the second input member 28B, 128B rotates in the delayed phase relative to the first input member 28A, 128A in a case where the operation handle 20 is operated to rotate in the first direction. Alternatively, in a case where the operation handle 20 is operated to rotate in the second direction, the second input member 28B, 128B may actively rotate in the delayed phase relative to the first input member 28A, 128A.

The aforementioned alternative configuration may be easily obtained in the following manner, for example. At the neutral position P0, not only the engagement projection 37 is away from the first circumferential end portion 35a of the first engagement bore 35 with which the engagement projection 37 engages in a case where the operation handle 20 is operated in the first direction but also the engagement projection 37 is away from the second circumferential end portion 35b of the first engagement bore 35 with which the engagement projection 37 engages in a case where the operation handle 20 is operated in the second direction.

In the rotation operation of the operation handle 20 in the second direction, the second input member 28B, 128B may rotate without delay relative to the first input member 28A, 128A. Such alternative configuration may be easily obtained in a case where the engagement projection 37 is configured to make contact with the second circumferential end portion 35b of the first engagement bore 35 at the neutral position P0.

The configuration of the spring member 30, 130 may be appropriately changed. For example, the spring body 41, 141 is not necessarily formed in a substantially C shape. The spring body 41, 141 may be in a bending form extending around the support shaft Q2 by including one or plural bending portion(s).

The configuration of the intermediate engagement portion may be appropriately changed. For example, the bore portion 52 may be obtained by a cut-out at an end portion of the spring body 41 in the width direction thereof. In addition, the bore portion 52 may not necessarily penetrate through the spring body 41 in the radial direction and may penetrate through the spring body 41 in the axial direction of the support shaft Q2. The bore portion 52 may not necessarily be a penetration bore. A protruding portion formed at the spring body 41 may constitute the intermediate engagement portion. That is, the engagement configuration between the input member 28 (128A, 128B), and the spring member 30, 130 may be appropriately changed.

In the first and second embodiments, the first spring portion 55a generating the returning force during the rotation operation of the operation handle 20 in the first direction serves as the base spring portion (L=L1) while the second spring portion 55b generating the returning force during the rotation operation of the operation handle 20 in the second direction serves as the reinforced spring portion of which the effective spring length L is shorter than that of the base spring portion (L=L2<L1). Alternatively, the spring portion generating the returning force during the rotation operation of the operation handle 20 in the first direction may serve as the reinforced spring portion while the spring portion generating the returning force during the rotation operation of the operation handle 20 in the second direction may serve as the base spring portion. As long as either one of the spring portions is appropriately selected and specified for generating the returning force (i.e., the spring portions are switchable therebetween) depending on the direction of rotation operation of the operation handle 20, both of the spring portions may serve as the reinforced spring portions utilized for generating the returning force during the rotation operation of the operation handle 20 in both the first direction and the second direction.

In the second embodiment, during the rotation operation of the operation handle 20 in the first direction, the first spring portion 55a generating the returning force for rotating the operation handle 20 from the neutral position P0 serves as the base spring portion (L=L1), and the third spring portion 55c generating the returning force for rotating the operation handle 20 so as to return the operation handle 20 to the neutral position P0 serves as the reinforced spring portion (L=L3<L1). Alternatively, as long as either one of the spring portions is selected and specified for generating the returning force (i.e., the spring portions are switchable therebetween) depending on the direction of rotation operation of the operation handle 20, both of the spring portions 55a and 55c may serve as the reinforced spring portions utilized for both the input operation and the return operation, i.e., for generating the returning force in cases where the operation handle 20 rotates from the neutral position P0 and where the operation handle 20 returns to the neutral position P0. In the rotation operation of the operation handle 20 also in the second direction, the spring portions may be provided for the input operation and the return operation. Further, the spring portion generating the returning force for rotating the operation handle 20 from the neutral position P0 may serve as the reinforced spring portion while the spring portion generating the returning force for returning the operation handle 20 to the neutral position P0 may serve as the base spring portion.

The number of the intermediate engagement portions 58 formed at the spring member 30, 130 may be three or more than three. Any of the spring portions may be utilized for generating the returning force as long as the opposed spring end portions SP1 and SP2 are constituted by two portions among the intermediate engagement portions 58 and the end engagement portions 56 separating from each other in the circumferential direction. That is, without utilizing the end engagement portions 56, the spring portion may be obtained by two of the intermediate engagement portions 58 separating from each other in the circumferential direction and serving as the opposed spring end portions SP1 and SP2 for generating the returning force.

In the first and second embodiments, based on the difference in the effective spring length L (L1 to L3), the spring portions 55a, 55b, and 55c are specified to include the different spring forces from one another. Alternatively, as long as the spring portions are integrally formed as the spring member, the spring portions 55a, 55b, and 55c may be specified to include the different spring forces by the different methods, for example, by changing a thickness or a width in the circumferential direction of the spring portions corresponding to the extending direction thereof.

The configuration of the seat lifting apparatus 10 may be appropriately changed. For example, arrangements of the link mechanism 12 and the rotation control apparatus 21 may be changed. In addition, the configurations of the link mechanism 12 and the rotation control apparatus 21 may be appropriately changed. The handle returning apparatus may be specified for returning the operation handle that is applied to an apparatus other than the seat lifting apparatus 10 to the neutral position.

For example, the operation handle is applicable to a seat for a vehicle used for locking/unlocking operation. Then, a lock mechanism of a seat slide apparatus is unlocked by the rotation operation of the operation handle in the first direction, and a lock mechanism of a seat reclining apparatus is unlocked by the rotation operation of the operation handle in the second direction. The different apparatuses may be operated on a basis of the directions of the rotation operation.

In the aforementioned first and second embodiments, the plural spring portions 55a, 55b, (55c) includes the different effective spring lengths L (L1, L2, L3) from one another between the first and second spring end portions SP1 and SP2.

In addition, in the embodiments, the spring member 30, 130 includes the spring body 41, 141 extending around the support shaft Q2 and including the first and second end portions 41a, 141a and 41b, 141b, the spring member 30, 130 including the reinforced spring portion 55b, 55c in which one of the first and second spring end portions SP1 and SP2 is formed by the intermediate engagement portion 58, 58b formed between the first and second end portions 41a, 141a and 41b, 141b of the spring body 41, 141.

Further, in the second embodiment, the intermediate engagement portion of the spring member 130 includes the plural intermediate engagement portions 58 and 58b.

Furthermore, in the first and second embodiments, the intermediate engagement portion 58 is obtained by the bore portion 52 formed at the spring body 41, 141.

Furthermore, in the first and second embodiments, the spring member 30, 130 includes the spring portion 55a for generating the returning force in a case where the operation handle 20 is operated to rotate in the first direction and the spring portion 55b for generating the returning force in a case where the operation handle 20 is operated to rotate in the second direction.

Furthermore, in the second embodiment, the spring member 130 includes the spring portion 55a for generating the returning force to rotate the operation handle 20 from the neutral position P0 and the spring portion 55c for generating the returning force to return the operation handle 20 to the neutral position P0.

Accordingly, the appropriate returning force may be generated for both the input operation and the return operation of the operation handle 20. As a result, the operation performance of the operation handle 20 may be appropriately secured. Specifically, the greater returning force is specified for the return operation of the operation handle 20 so as to improve the returning performance of the operation handle 20 to the neutral position P0. The secure operation of the handle returning apparatus 31 in which the components are operated in conjunction with the rotation operation of the operation handle 20 may be obtained.

In the second embodiment, the input member 28 includes the first input member 128A and the second input member 128B relatively rotatable to each other, the first input member 128A and the second input member 128B being connected to each other by the connection mechanism 32 so that torque transmission between the first input member 128A and the second input member 128B is achievable and so that one of the first input member 128A and the second input member 128B rotates in a delayed phase relative to the other of the first input member 128A and the second input member 128B, and the spring member 130 includes the spring portion 55a in which one of the first and second spring end portions SP1 and SP2 engages with the first input member 128A and the spring portion 550 in which one of the first and second spring end portions SP1 and SP2 engages with the second input member 128B.

Accordingly, the spring portions are brought to engage with the first input member 28A, 128A and the second input member 28B, 128B at different timing from each other. Thus, based on timing at which each of the spring portions engages with the corresponding first or second input member 28A, 128A or 28B, 128B the appropriate returning force depending on the condition of rotation operation of the operation handle 20 may be generated.

In the first and second embodiments, the spring member 30, 130 includes the base spring portion 55a in which the first spring end portion SP1 is formed by the first end portion 41a, 141a of the spring body 41, 141 engaging with the input member 28 and the second spring end portion SP2 is formed by the second end portion 41b, 141b of the spring body 41, 141 engaging with the fixation member 23, and the reinforced spring portion 55b in which the first spring end portion SP1 is formed by the intermediate engagement portion 58, 58b engaging with the input member 28 and the second spring end portion SP2 is formed by the first end portion 41a, 141a of the spring body 41, 141 engaging with the fixation member 23, the base spring portion 55a generating the returning force in a case where the operation handle 20 is operated to rotate in the first direction, the reinforced spring portion 55b generating the returning force in a case where the operation handle 20 is operated to rotate in the second direction.

In the second embodiment, the spring member 130 includes the base spring portion 55a in which the first spring end portion SP1 is formed by the first end portion 141a of the spring body 141 engaging with the first input member 128A and the second spring end portion SP2 is formed by the second end portion 141b of the spring body 141 engaging with the fixation member 23, and the reinforced spring portion 55c in which the first spring end portion SP1 is formed by the intermediate engagement portion 58b formed at the spring body 141 and engaging with the second input member 128B and the second spring end portion SP2 is formed by the second end portion 141b of the spring body 141 engaging with the fixation member 23, the base spring portion 55a generating the returning force in a case where the operation handle is operated to rotate from the neutral position P0, the forced spring portion 55c generating the returning force in a case where the operation handle is operated to return to the neutral position P0.

In the first and second embodiments, the operation handle 20 is provided at a side of the seat 1 in the width direction thereof to be rotatable in the up-down direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A handle returning apparatus comprising:
an input member rotating in conjunction with an operation handle that is operated to rotate in a first direction and a second direction including a neutral position; and
a spring member including a plurality of spring portions which is integrally formed, the plurality of spring portions including different spring forces from one another and extending around a support shaft of the input member,
each of the plurality of spring portions including first and second spring end portions separating from each other in a circumferential direction of the spring member, each of the plurality of spring portions being configured to generate a returning force for returning the operation handle to the neutral position by being resiliently deformed on a basis of the rotation operation of the operation handle to bias the input member in a state where one of the first and second spring end portions engages with the input member and the other of the first and second spring end portions engages with a fixation member, the plurality of spring portions being selectively switchable therebetween to generate the returning force depending on a condition of the rotation operation of the operation handle.

2. The handle returning apparatus according to claim 1, wherein the plurality of spring portions includes different effective spring lengths from one another between the first and second spring end portions.

3. The handle returning apparatus according to claim 2, wherein the spring member includes a spring body extending around the support shaft and including first and second end portions, the spring member including a reinforced spring portion in which one of the first and second spring end portions is formed by an intermediate engagement portion formed between the first and second end portions of the spring body.

4. The handle returning apparatus according to claim 3, wherein the intermediate engagement portion of the spring member includes a plurality of intermediate engagement portions.

5. The handle returning apparatus according to claim 3, wherein the intermediate engagement portion is obtained by a bore portion formed at the spring body.

6. The handle returning apparatus according to claim 1, wherein the spring member includes the spring portion for generating the returning force in a case where the operation handle is operated to rotate in the first direction and the spring portion for generating the returning force in a case where the operation handle is operated to rotate in the second direction.

7. The handle returning apparatus according to claim 1, wherein the spring member includes the spring portion for generating the returning force to rotate the operation handle from the neutral position and the spring portion for generating the returning force to return the operation handle to the neutral position.

8. The handle returning apparatus according to claim 1, wherein the input member includes a first input member and a second input member relatively rotatable to each other, the first input member and the second input member being connected to each other by a connection mechanism so that a torque transmission between the first input member and the second input member is achievable and so that one of the first input member and the second input member rotates in a delayed phase relative to the other of the first input member and the second input member, and the spring member includes the spring portion in which one of the first and second spring end portions engages with the first input member and the spring portion in which one of the first and second spring end portions engages with the second input member.

9. The handle returning apparatus according to claim 3, wherein the input member includes a first input member and a second input member relatively rotatable to each other, the first input member and the second input member being connected to each other by a connection mechanism so that a torque transmission between the first input member and the second input member is achievable and so that one of the first input member and the second input member rotates in a delayed phase relative to the other of the first input member and the second input member, and the spring member includes the spring portion in which one of the first and second spring end portions engages with the first input member and the spring portion in which one of the first and second spring end portions engages with the second input member.

10. The handle returning apparatus according to claim 3, wherein the spring member includes a base spring portion in which the first spring end portion is formed by the first end portion of the spring body engaging with the input member and the second spring end portion is formed by the second end portion of the spring body engaging with the fixation member, and the reinforced spring portion in which the first spring end portion is formed by the intermediate engagement portion engaging with the input member and the second spring end portion is formed by the first end portion of the spring body engaging with the fixation member, the base spring portion generating the returning force in a case where the operation handle is operated to rotate in the first direction, the reinforced spring portion generating the returning force in a case where the operation handle is operated to rotate in the second direction.

11. The handle returning apparatus according to claim 9, wherein the spring member includes a base spring portion in which the first spring end portion is formed by the first end portion of the spring body engaging with the first input member and the second spring end portion is formed by the second end portion of the spring body engaging with the fixation member, and the reinforced spring portion in which the first spring end portion is formed by the intermediate engagement portion formed at the spring body and engaging with the second input member and the second spring end portion is formed by the second end portion of the spring body engaging with the fixation member, the base spring portion generating the returning force in a case where the operation handle is operated to rotate from the neutral position, the reinforced spring portion generating the returning force in a case where the operation handle is operated to return to the neutral position.

12. A seat lifting apparatus for a vehicle, comprising:
a link mechanism including a link member that is rotatably provided, the link mechanism supporting a seat at an upper side of the link mechanism via the link member;
a sector gear integrally rotating with the link member via a common rotation shaft;
a pinion gear meshed with the sector gear;
a handle returning apparatus including an input member rotating in conjunction with an operation handle that is operated to rotate in a first direction and a second direction including a neutral position, and a spring member including a plurality of spring portions which is integrally formed, the plurality of spring portions including different spring forces from one another and extending around a support shaft of the input member, each of the plurality of spring portions including first and second spring end portions separating from each other in a circumferential direction of the spring member, each of the plurality of spring portions being configured to generate a returning force for returning the operation handle to the neutral position by being resiliently deformed on a basis of the rotation operation of the operation handle to bias the input member in a state where one of the first and second spring end portions engages with the input member and the other of the first and second spring end portions engages with a fixation member, the plurality of spring portions being selectively switchable therebetween to generate the returning force depending on a condition of the rotation operation of the operation handle; and
a rotation control apparatus disposed between the pinion gear and the operation handle and configured to move the seat upwardly and downwardly by driving to rotate the pinion gear based on a rotation operation input to the operation handle.

13. The seat lifting apparatus according to claim 12, wherein the operation handle is provided at a side of the seat in a width direction thereof to be rotatable in an up-down direction.

* * * * *